United States Patent
Chen et al.

(10) Patent No.: US 12,557,090 B2
(45) Date of Patent: Feb. 17, 2026

(54) UPLINK CHANNEL TRANSMISSION METHOD AND APPARATUS, AND BASE STATION, TERMINAL AND STORAGE MEDIUM

(71) Applicant: DATANG MOBILE COMMUNICATIONS EQUIPMENT CO., LTD., Beijing (CN)

(72) Inventors: Runhua Chen, Beijing (CN); Hui Li, Beijing (CN); Yajuan Luo, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 733 days.

(21) Appl. No.: 17/909,749

(22) PCT Filed: Dec. 16, 2020

(86) PCT No.: PCT/CN2020/136875
§ 371 (c)(1),
(2) Date: Sep. 6, 2022

(87) PCT Pub. No.: WO2021/179725
PCT Pub. Date: Sep. 16, 2021

(65) Prior Publication Data
US 2023/0144956 A1 May 11, 2023

(30) Foreign Application Priority Data
Mar. 13, 2020 (CN) .......................... 202010177082.2

(51) Int. Cl.
*H04W 72/12* (2023.01)
*H04B 7/0408* (2017.01)
(Continued)

(52) U.S. Cl.
CPC .......... *H04W 72/12* (2013.01); *H04B 7/0408* (2013.01); *H04B 7/06952* (2023.05);
(Continued)

(58) Field of Classification Search
CPC ... H04W 72/12; H04W 72/21; H04W 72/231; H04W 74/0833; H04W 72/1268;
(Continued)

(56) References Cited

U.S. PATENT DOCUMENTS 11,303,408 B2 * 4/2022 Liu .................. H04B 7/0695
11,812,449 B2 * 11/2023 Zhou .................. H04B 7/088
(Continued)

FOREIGN PATENT DOCUMENTS

CN 108988921 A 12/2018
CN 109150453 A 1/2019
(Continued)

OTHER PUBLICATIONS

Samsung, "UL beam management RS", 3GPP TSG RAN WG1 #87, Reno, USA Nov. 14-18, 2016, total 5 pages, R1-1612496.
(Continued)

*Primary Examiner* — Brian T O Connor
(74) *Attorney, Agent, or Firm* — KILPATRICK TOWNSEND & STOCKTON LLP

(57) ABSTRACT

The embodiments of the present application provide a method for transmitting an uplink channel, an apparatus, a base station, a terminal and a storage medium. The method includes the following steps: determining an uplink beam or a downlink beam; determining a first beam used for uplink channel transmission according to the uplink beam or the downlink beam, and a predetermined rule or first indication information configured for the terminal by the base station; and transmitting an uplink channel by using the first beam. Therefore, according to the embodiments of the present
(Continued)

application, the flexibility in selection of beams used by the uplink channel transmission is improved and the efficiency of the uplink channel transmission is increased.

20 Claims, 5 Drawing Sheets

(51) Int. Cl.
*H04B 7/06* (2006.01)
*H04L 5/00* (2006.01)
*H04W 72/21* (2023.01)
*H04W 72/231* (2023.01)
*H04W 74/0833* (2024.01)

(52) U.S. Cl.
CPC ........... *H04L 5/0053* (2013.01); *H04W 72/21* (2023.01); *H04W 72/231* (2023.01); *H04W 74/0833* (2013.01)

(58) Field of Classification Search
CPC . H04W 72/535; H04W 72/048; H04W 72/02; H04B 7/0408; H04B 7/06966; H04B 7/06968; H04B 7/0404; H04L 5/0053
See application file for complete search history.

(56) References Cited

U.S. PATENT DOCUMENTS

| | | | |
|---|---|---|---|
| 2020/0053717 A1* | 2/2020 | Zhou | H04W 72/21 |
| 2020/0059951 A1 | 2/2020 | Frenne et al. | |
| 2020/0313827 A1* | 10/2020 | Noh | H04B 7/088 |
| 2021/0144722 A1* | 5/2021 | Yang | H04L 25/0226 |
| 2024/0008063 A1* | 1/2024 | Zhou | H04B 7/06966 |
| 2024/0324046 A1* | 9/2024 | Cirik | H04W 72/1268 |

FOREIGN PATENT DOCUMENTS

| | | |
|---|---|---|
| CN | 110809331 A | 2/2020 |
| CN | 110838861 A | 2/2020 |
| WO | 2019083260 A1 | 5/2019 |
| WO | 2019157733 A1 | 8/2019 |
| WO | 2020020128 A1 | 1/2020 |

OTHER PUBLICATIONS

European Patent Office, the Extended European Search Report Issued in Application No. 20923812.0, Feb. 29, 2024, Germany, 13 pages.

* cited by examiner

UPLINK CHANNEL TRANSMISSION METHOD AND APPARATUS, AND BASE STATION, TERMINAL AND STORAGE MEDIUM

CROSS-REFERENCE TO RELATED APPLICATIONS

The present application is a US National Stage of International Application No. PCT/CN2020/136875, filed on Dec. 16, 2020, which claims priority to Chinese application No. 202010177082.2 filed on Mar. 13, 2020, entitled "Uplink Channel Transmission Method, Apparatus, Base Station, Terminal and Storage Medium", which is hereby incorporated by reference in their entireties.

FIELD

The present application relates to the field of communication, and in particular, to a method and a device for transmitting an uplink channel, a base station, a terminal, and a storage medium.

BACKGROUND

In a new radio (NR) system, an uplink channel includes a physical uplink shared channel (PUSCH) and a physical uplink control channel (PUCCH). At present, for high frequency transmission, due to the limited transmission range, generally, an uplink channel is transmitted after being beamformed to enhance coverage. In order to determine the direction of the formed beam, beam sweeping needs to be performed on an uplink or downlink reference signal to select a reference signal with good beam quality, and a beam used for uplink channel transmission is determined based on the beam of the reference signal. However, the beam used for uplink channel transmission is determined based on the beam of the reference signal, which is implemented singly, and the efficiency of uplink channel transmission is reduced.

SUMMARY

In order to solve the problems, embodiments of the present application provide a method and a device for transmitting an uplink channel, a base station, a terminal and a storage medium.

An embodiment of the present application provides a method for transmitting an uplink channel, performed by a terminal, and the method includes:
  determining an uplink beam or a downlink beam;
  determining a first beam used for uplink channel transmission according to the uplink beam or the downlink beam and a predetermined rule or first indication information configured for the terminal by a base station; and
  transmitting an uplink channel by using the first beam.

In an embodiment, the predetermined rule includes multiple sub-rules;
  the determining the first beam used for uplink channel transmission according to the uplink beam or the downlink beam and a predetermined rule, includes:
  acquiring second indication information configured for the terminal by the base station, where the second indication information includes an identifier used for indicating a sub-rule that is in effect; and
  determining the first beam used for uplink channel transmission from the uplink beam or the downlink beam according to the predetermined rule and the second indication information.

In an embodiment, the uplink channel includes a first physical uplink shared channel (PUSCH), and the first beam includes a second beam used for transmitting the first PUSCH.

In an embodiment, the predetermined rule or the first indication information includes one or more of the following sub-rules:
  the second beam is determined according to a beam of a physical downlink control channel (PDCCH) scheduling the first PUSCH;
  the second beam is determined according to a beam of a first control resource set (CORESET);
  the second beam is determined according to a beam of a demodulation reference signal (DMRS) in a first physical downlink shared channel (PDSCH);
  the second beam is determined according to a beam of a reference signal in a first channel state information reference signal resource indicator (CRI) report of the terminal; where the first CRI report is used to characterize a latest CRI report before the terminal determines the second beam;
  the second beam is determined according to a beam used by a first random access channel (RACH); and the first RACH is used to characterize a latest RACH before the terminal determines the second beam;
  the second beam is determined according to a beam of a predefined second PUSCH;
  the second beam is determined according to a beam of a sounding reference signal (SRS) used for determining a transmission beam for PDSCH;
  the second beam is determined according to a beam used by a first physical uplink control channel (PUCCH).

In an embodiment, the first CORESET includes:
  a fixed CORESET; or
  a CORESET with the smallest identification (ID) number in a first slot in which a search space is present; where the first slot is used to characterize the latest slot in which the search space is present before the terminal determines the second beam.

In an embodiment, the first PDSCH includes:
  a latest PDSCH before the terminal determines the second beam; or
  a latest PDSCH before the terminal determines the second beam, and the latest PDSCH is within a time window; or
  a latest PDSCH before the terminal determines the second beam, and the latest PDSCH is out of a time window.

In an embodiment, the beam used by the first PUCCH channel includes:
  a beam of a predefined PUCCH resource; or
  a beam of a dynamically scheduled PUCCH resource for feeding back acknowledgement (ACK) information or non-acknowledgement (NACK) information.

In an embodiment, the predefined PUCCH resources include:
  a fixed PUCCH resource; or
  a PUCCH resource with a resource index changing according to a specified rule.

In an embodiment, the uplink channel includes a second PUCCH, and the first beam includes a third beam used for transmitting the second PUCCH.

In an embodiment, the predetermined rule or the first indication information includes one or more of the following sub-rules:
the third beam is determined according to a PDCCH indication;
the third beam is determined according to a beam of a PDCCH used for scheduling the second PUCCH;
the third beam is determined according to a predefined third PUSCH;
the third beam is determined according to a beam used by a second RACH where the second RACH is used to characterize a latest RACH before the terminal determines the third beam;
the third beam is determined according to a beam of a second CORESET;
the third beam is determined according to a beam used by a PDSCH associated with the PUCCH.

In an embodiment, the third PUSCH includes:
a latest PUSCH before the terminal determines the third beam; or
a latest PUSCH before the terminal determines the third beam, and the latest PUSCH does not exceed a time window.

In an embodiment, the second CORESET includes:
a fixed CORESET; or
a CORESET with the smallest ID number in a second slot in which a search space is present; and the second slot is used to characterize the latest slot in which the search space is present before the terminal determines the third beam.

An embodiment of the present application provides a method for transmitting an uplink channel, performed by a base station, and the method includes:
determining an uplink beam or a downlink beam;
determining a first beam used for uplink channel transmission according to the uplink beam or the downlink beam, and a predetermined rule or first indication information configured for the terminal by the base station; and
receiving an uplink channel by using the first beam.

In an embodiment, the predetermined rule includes multiple sub-rules;
the determining the first beam used for uplink channel transmission according to the uplink beam or the downlink beam, and a predetermined rule, includes:
acquiring second indication information configured for the terminal by the base station, and the second indication information includes an identifier used for indicating a sub-rule that is in effect; and
determining the first beam used for uplink channel transmission from the uplink beam or the downlink beam according to the predetermined rule and the second indication information.

In an embodiment, the uplink channel includes a first physical uplink shared channel (PUSCH), and the first beam includes a second beam used for transmitting the first PUSCH.

In an embodiment, the predetermined rule or the first indication information includes one or more of the following sub-rules:
the second beam is determined according to a beam of a physical downlink control channel (PDCCH) scheduling the first PUSCH;
the second beam is determined according to a beam of a first control resource set (CORESET);
the second beam is determined according to a beam of a demodulation reference signal (DMRS) in a first physical downlink shared channel (PDSCH);
the second beam is determined according to a beam of a reference signal in a first channel state information reference signal resource indicator (CRI) report by the terminal; and the first CRI report is used to characterize a latest CRI report before the terminal determines the second beam;
the second beam is determined according to a beam used by a first random access channel (RACH); and the first RACH is used to characterize a latest RACH before the terminal determines the second beam;
the second beam is determined according to a beam of a predefined second PUSCH;
the second beam is determined according to a beam of a sounding reference signal (SRS) used for determining a transmission beam for PDSCH;
the second beam is determined according to a beam used by a first physical uplink control channel (PUCCH).

In an embodiment, the uplink channel includes a second PUCCH, and the first beam includes a third beam used for transmitting the second PUCCH.

In an embodiment, the predetermined rule or the first indication information includes one or more of the following sub-rules:
the third beam is determined according to a PDCCH indication;
the third beam is determined according to a beam of a PDCCH used for scheduling the second PUCCH;
the third beam is determined according to a predefined third PUSCH;
the third beam is determined according to a beam used by a second RACH channel; and the second RACH is used to characterize a latest RACH before the terminal determines the third beam;
the third beam is determined according to a beam of a second CORESET;
the third beam is determined according to a beam used by a PDSCH associated with the PUCCH.

An embodiment of the present application provides a device for transmitting an uplink channel, where the device is used for a terminal, and includes:
a first determining device, configured to determine an uplink beam or a downlink beam;
a second determining device, configured to determine a first beam used for uplink channel transmission according to the uplink beam or the downlink beam, and a predetermined rule or first indication information configured for the terminal by a base station; and
a transmitting device, configured to transmit an uplink channel by using the first beam.

An embodiment of the present application provides a device for transmitting an uplink channel, where the device f is used for a base station, and includes:
a third determining device, configured to determine an uplink beam or a downlink beam;
a fourth determining device, configured to determine a first beam used for uplink channel transmission according to the uplink beam or the downlink beam, and a predetermined rule or first indication information configured for the terminal by the base station; and
a receiving device, configured to receive an uplink channel by using the first beam.

The embodiment of the application provides a terminal, including a processor and a memory storing a program stored that is executable on the processor, where the program, when executed on the processor, causes the processor to perform the following steps:
    determining an uplink beam or a downlink beam;
    determining a first beam used for uplink channel transmission according to the uplink beam or the downlink beam, and a predetermined rule or first indication information configured for the terminal by a base station; and
    transmitting an uplink channel by using the first beam.

In an embodiment, the predetermined rule includes multiple sub-rules;
    the determining the first beam used for uplink channel transmission according to the uplink beam or the downlink beam, and a predetermined rule, includes:
    acquiring second indication information configured for the terminal by the base station, where the second indication information includes an identifier used for indicating a sub-rule that is in effect; and
    determining the first beam used for uplink channel transmission from the uplink beam or the downlink beam according to the predetermined rule and the second indication information.

In an embodiment, the uplink channel includes a first physical uplink shared channel (PUSCH), and the first beam includes a second beam used for transmitting the first PUSCH.

In an embodiment, the predetermined rule or the first indication information includes one or more of the following sub-rules:
    the second beam is determined according to a beam of a physical downlink control channel (PDCCH) scheduling the first PUSCH;
    the second beam is determined according to a beam of a first control resource set (CORESET);
    the second beam is determined according to a beam of a demodulation reference signal (DMRS) in a first physical downlink shared channel (PDSCH);
    the second beam is determined according to a beam of a reference signal in a first channel state information reference signal resource indicator (CRI) report of the terminal; where the first CRI report is used to characterize a latest CRI report before the terminal determines the second beam;
    the second beam is determined according to a beam used by a first random access channel (RACH); where the first RACH is used to characterize a latest RACH before the terminal determines the second beam;
    the second beam is determined according to a beam of a predefined second PUSCH;
    the second beam is determined according to a beam of a sounding reference signal (SRS) used for determining a transmission beam for PDSCH; and
    the second beam is determined according to a beam used by a first physical uplink control channel (PUCCH).

In an embodiment, the first CORESET includes:
    a fixed CORESET; or
    a CORESET with the smallest identification (ID) number in a first slot in which a search space is present; and the first slot is used to characterize the latest slot in which the search space is present before the terminal determines the second beam.

In an embodiment, the first PDSCH includes:
    a latest PDSCH before the terminal determines the second beam; or
    a latest PDSCH before the terminal determines the second beam, and the latest PDSCH is within a time window; or
    a latest PDSCH before the terminal determines the second beam, and the latest PDSCH is out of a time window.

In an embodiment, the beam used by the first PUCCH channel includes:
    a beam of a predefined PUCCH resource; or
    a beam of a dynamically scheduled PUCCH resource for feeding back acknowledgement (ACK) information or non-acknowledgement (NACK) information.

In an embodiment, the predefined PUCCH resources include:
    a fixed PUCCH resource; or
    a PUCCH resource with a resource index changing according to a specified rule.

In an embodiment, the uplink channel includes a second PUCCH, and the first beam includes a third beam used for transmitting the second PUCCH.

In an embodiment, the predetermined rule or the first indication information includes one or more of the following sub-rules:
    the third beam is determined according to a PDCCH indication;
    the third beam is determined according to a beam of a PDCCH used for scheduling the second PUCCH;
    the third beam is determined according to a predefined third PUSCH;
    the third beam is determined according to a beam used by a second RACH; where the second RACH is used to characterize a latest RACH before the terminal determines the third beam;
    the third beam is determined according to a beam of a second CORESET;
    the third beam is determined according to a beam used by a PDSCH associated with the PUCCH.

In an embodiment, the third PUSCH includes:
    a latest PUSCH before the terminal determines the third beam; or
    a latest PUSCH before the terminal determines the third beam, and the latest PUSCH does not exceed a time window.

In an embodiment, the second CORESET includes:
    a fixed CORESET; or
    a CORESET with the smallest ID number in a second slot in which a search space is present;
    where the second slot is used to characterize the latest slot in which the search space is present before the terminal determines the third beam.

The embodiment of the application provides a base station, including a processor and a memory storing a program that is executable on the processor, where the program, when executed by the processor to perform the following steps:
    determining an uplink beam or a downlink beam;
    determining a first beam used for uplink channel transmission according to the uplink beam or the downlink beam, and a predetermined rule or first indication information configured for a terminal by the base station; and
    receiving an uplink channel using the first beam.

In an embodiment, the predetermined rule includes multiple sub-rules;
    the determining the first beam used for uplink channel transmission according to the uplink beam or the downlink beam, and a predetermined rule, includes:
    acquiring second indication information configured for the terminal by the base station, where the second indication information includes an identifier used for indicating a sub-rule that is in effect; and determining the first beam used for uplink channel transmission from the uplink beam or the downlink beam according to the predetermined rule and the second indication information.

In an embodiment, the uplink channel includes a first physical uplink shared channel (PUSCH), and the first beam includes a second beam used for transmitting the first PUSCH.

In an embodiment, the predetermined rule or the first indication information includes one or more of the following sub-rules:
the second beam is determined according to a beam of a physical downlink control channel (PDCCH) scheduling the first PUSCH;
the second beam is determined according to a beam of a first control resource set (CORESET);
the second beam is determined according to a beam of a demodulation reference signal (DMRS) in a first physical downlink shared channel (PDSCH);
the second beam is determined according to a beam of a reference signal in a first channel state information reference signal resource indicator (CRI) report of the terminal; where the first CRI report is used to characterize a latest CRI report before the terminal determines the second beam;
the second beam is determined according to a beam used by a first random access channel (RACH); and the first RACH is used to characterize a latest RACH before the terminal determines the second beam;
the second beam is determined according to a beam of a predefined second PUSCH; the second beam is determined according to a beam of a sounding reference signal (SRS) used for determining a transmission beam for PDSCH; and
the second beam is determined according to a beam used by a first physical uplink control channel (PUCCH).

In an embodiment, the uplink channel includes a second PUCCH, and the first beam includes a third beam used for transmitting the second PUCCH.

In an embodiment, the predetermined rule or the first indication information includes one or more of the following sub-rules:
the third beam is determined according to a PDCCH indication;
the third beam is determined according to a beam of a PDCCH used for scheduling the second PUCCH;
the third beam is determined according to a predefined third PUSCH;
the third beam is determined according to a beam used by a second RACH; and the second RACH is used to characterize a latest RACH before the terminal determines the third beam;
the third beam is determined according to a beam of a second CORESET;
the third beam is determined according to a beam used by a PDSCH associated with the PUCCH.

An embodiment of the present application provides a non-transitory computer-readable storage medium storing a computer program, the computer program, when executed by a processor, causes the processor to perform the steps of the method for transmitting an uplink channel on the terminal side.

An embodiment of the present application provides a non-transitory computer-readable storage medium storing a computer program, the computer program, when executed by a processor, causes the processor to perform the steps of the method for transmitting an uplink channel on the base station side.

The embodiments of the present application provide a method and a device for transmitting an uplink channel, a base station, a terminal and a storage medium, after determining an uplink beam or a downlink beam, a first beam used for uplink channel transmission may be determined from the uplink beam or the downlink beam based on a predetermined rule or first indication information configured for the terminal by the base station, and the uplink channel is transmitted by using the first beam, to improve the flexibility in selection of beams used for uplink channel transmission, and increasing efficiency of uplink channel transmission.

BRIEF DESCRIPTION OF THE DRAWINGS

In order to more clearly illustrate solutions disclosed in the embodiments of the present application, the drawings used in the descriptions of the embodiments, or the prior art will be briefly described below. The drawings in the following description are only some embodiments of the present application, and other drawings can be obtained according to the drawings.

DETAILED DESCRIPTION

Figure 1:
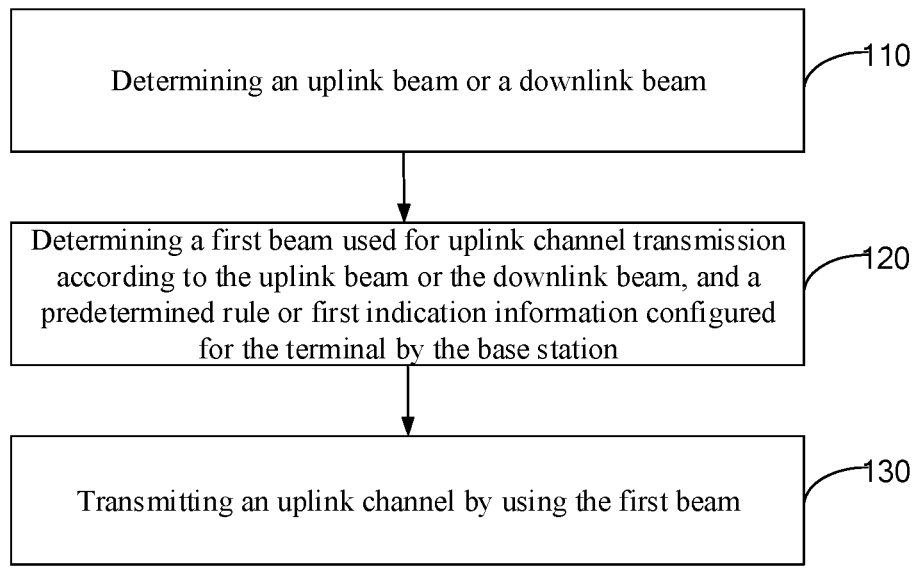
FIG. 1 is a flowchart of a method of an embodiment of the present application.

The embodiments of the present application will be described clearly and completely with reference to the drawings in the embodiments of the present application, and the described embodiments are some, but not all embodiments of the present application.

In order to clear describe solutions of the embodiments of the present application, in the embodiments of the present application, if words such as "first" and "second" are used to distinguish identical items or similar items with substantially the same functions and actions, and it should be understood that words such as "first" and "second" do not limit the quantity and execution order.

In the NR system, an uplink channel includes a PUSCH and a PUCCH.

At present, for high frequency transmission, due to the limited transmission range, generally, an uplink channel is transmitted after being beamformed to enhance coverage. In order to determine the direction of the formed beam, beam sweeping needs to be performed on an uplink or downlink reference signal to select a reference signal with good beam quality, and a beam transmitted by an uplink channel is determined based on the beam of the reference signal.

For the PUCCH, the beam used for uplink channel transmission selected by the base station is semi-statically configured directly to the terminal through spatial relation information (Spatial Relation Info);

for the PUSCH, the beam used for uplink channel transmission selected by the base station is indirectly indicated by spatial relation Info of a sounding reference signal (SRS) resource indicated by a sounding reference signal resource indicator (SRI) in a dynamic signaling downlink control information (DCI).

However, the beam for PUSCH transmission, although dynamically indicated, can only be determined by the beam of the reference signal; the beam transmitted by the PUCCH can only be configured semi-statically and cannot be changed dynamically and the flexible selection of the beam used by uplink channel transmission is limited.

In view of the foregoing problems, the embodiments of the present application provide a method and a device for transmitting an uplink channel, a base station, a terminal and a storage medium to improve flexible selection of a beam used for uplink channel transmission.

The method and the device for transmitting an uplink channel, a base station, a terminal and a storage medium according to the embodiments of the present application can be applied to a wireless communication system or a system combining wireless and wired communication. Including but not limited to a 5G system (e.g., NR systems), a 6G system, a satellite system, an Internet of vehicles system, a long-term evolution (LTE) system, and subsequent evolution communication systems thereof.

The base station provided in the embodiments of the present application may include, but not limited to, one or more of the following: generally base station, an evolved node base station (eNB), a network side apparatus in a 5G system (e.g., a next generation node base station (gNB), a transmission and reception point (TRP)), and other apparatus are used.

The terminal according to the embodiment of the application can be called as user equipment and the like. The terminal includes a handheld apparatus and a vehicle-mounted apparatus. For example, the mobile phone, tablet pc, notebook pc, ultra-mobile personal computer (UMPC), netbook, or personal digital assistant (PDA) may be used.

The following description is given by way of specific examples.

FIG. 1 is a flowchart of a method for transmitting an uplink channel according to an embodiment of the present application, where the method may be performed by a terminal. As shown in FIG. 1, the method for transmitting an uplink channel includes the following steps:

step 110: determining an uplink beam or a downlink beam.

The uplink beam may be obtained through uplink beam management and used for downlink data transmission. The uplink beam may include, but not limited to, one or more of the following:

a beam of the most recent RACH (random access channel);

a predefined beam of PUSCH; and a beam used by the PUCCH.

The most recent RACH may refer to a latest RACH before the terminal determines a first beam used for uplink channel transmission.

In addition, the downlink beam may be obtained through downlink beam management and used for downlink transmission. The downlink beam may include, but not limited to, one or more of the following:

a beam of a physical downlink control channel (PDCCH);

a beam of a downlink control-resource set (CORESET);

a beam of a demodulation reference signal (DMRS) in a physical downlink shared channel (PDSCH);

a beam of a reference signal in a latest channel state information-reference signal resource indicator (CRI) report by a terminal;

a beam used for determining SRS in downlink PDSCH; and the beam used by the downlink PDSCH channel.

A latest CRI report may refer to the latest CRI report before the terminal determines the first beam used for uplink channel transmission.

Step 120: determining a first beam used for uplink channel transmission according to the uplink beam or the downlink beam, and a predetermined rule or first indication information configured for the terminal by the base station.

The terminal may determine the first beam used for uplink channel transmission from the uplink beam or the downlink beam according to a predetermined rule, or may determine the first beam used for uplink channel transmission from the uplink beam or the downlink beam according to the first indication information configured for the terminal by the base station and used for beam management.

The predetermined rule may be a rule predefined by the system.

The first indication information may be indicated to the terminal by the base station through a dynamic instruction.

The uplink channel may include at least one of a PUSCH or a PUCCH.

Step 130: transmitting an uplink channel by using the first beam.

From the foregoing embodiments, after determining an uplink beam or a downlink beam, a first beam used for uplink channel transmission may be determined from the uplink beam or the downlink beam in combination with a predetermined rule or first indication information configured for the terminal by the base station, and an uplink channel is transmitted using the first beam, the flexibility in selection of beams used for uplink channel transmission is improved, and efficiency of uplink channel transmission is increased.

Further, based on the method, the predetermined rule in step 120 includes one or more sub-rules; and the second indication information configured for the terminal by the base station includes an identifier used for indicating a sub-rule that is in effect.

When the first beam used for uplink channel transmission is determined according to the uplink beam or the downlink beam and the predetermined rule in the step 120, second indication information configured for the terminal by the base station may be obtained first, where the second indication information includes an identifier used for indicating that the sub-rule that is in effect; and the first beam used for uplink channel transmission is determined from the uplink beam or the downlink beam according to the predetermined rule and the second indication information.

The base station may indicate a sub-rule coming into effect in the predetermined rule through higher layer signaling or physical layer signaling. For example, and the terminal determines a sub-rule coming into effect in the predetermined rule according to the second indication information, and determines the first beam used by the uplink channel transmission according to the sub-rule coming into effect.

From the above embodiments that, after determining the uplink beam or the downlink beam, the first beam used for uplink channel transmission may be determined from the uplink beam or the downlink beam in combination with the predetermined rule and the second indication information configured for the terminal by the base station, and the uplink channel is transmitted using the first beam, the selection manners for determining the first beam is enriched and the reliability of uplink channel transmission is improved.

Further, based on the foregoing method, the uplink channel in step 120 may include a first PUSCH, and the first beam used for uplink channel transmission includes a second beam used for transmitting the first PUSCH.

When step 120 is executed, the second beam used for transmitting the first PUSCH can be determined from the uplink beam or the downlink beam according to the predetermined rule; or the second beam used for transmitting the first PUCCH can be determined from the uplink beam or the downlink beam according to first indication information configured for beam management by the base station for the terminal; or the second beam used for transmitting the first PUSCH can be determined from the uplink beam or the downlink beam according to the predetermined rule and the second indication information; the predetermined rule includes multiple sub-rules, and the second indication information configured for the terminal by the base station includes an identifier for indicating that a sub-rule that is in effect.

As can be seen from the foregoing embodiments, after determining an uplink beam or a downlink beam, a second beam used for first PUSCH transmission may be determined from the uplink beam or the downlink beam in combination with a predetermined rule or first indication information configured for the terminal by the base station, and the first PUSCH is transmitted using the second beam, flexible selection of a beam used for PUSCH transmission is improved, and efficiency of uplink channel transmission is increased.

Further, based on the above method, the predetermined rule or the first indication information corresponding to the second beam used for transmitting the first PUSCH includes one or more sub-rules selected from (1-1) to (1-8).

(1-1) the second beam is determined according to a beam of a PDCCH used for scheduling the first PUSCH.

The terminal may determine the second beam used for transmitting the first PUSCH according to the beam of the PDCCH used for scheduling the first PUSCH.

In an embodiment, the beam direction of the PDCCH is determined by the beam used by the reference signal indicated by the transmission configuration indication (TCI) state. Assuming that the TCI state indicates a channel state information-reference signal (CSI-RS) resource 1, it indicates that the beam direction of the PDCCH is the same as the beam direction of the CSI-RS resource 1. According to the sub-rule shown in (1-1), the terminal may determine the beam receiving CSI-RS resource 1 as the second beam used for transmitting the first PUSCH.

(1-2) the second beam is determined according to a beam of the first CORESET.

The terminal may determine the second beam used for transmitting the first PUSCH according to the beam for the first CORESET of the first PUSCH.

In an embodiment, the first CORESET in (1-2) above may include:
a fixed CORESET; or
a CORESET with the smallest identification (ID) number in the first slot in which a search space is present; where the first slot is used to characterize the latest slot in which a search space is present before the terminal determines the second beam.

In one embodiment, the first CORESET may be the CORESET with the smallest ID number. The terminal determines a reception beam for receiving the CORESET with the smallest ID number, and takes the reception beam as a beam for transmitting the first PUSCH.

(1-3) the second beam is determined according to a beam of the DMRS in the first PDSCH.

The terminal may determine the second beam used for transmitting the first PUSCH from the beam for the DMRS in the first PDSCH.

In an embodiment, the first PDSCH in (1-3) above may include: the latest PDSCH before the terminal determines the second beam; or
a latest PDSCH before the terminal determines the second beam, and the latest PDSCH is within a time window; or
a latest PDSCH before the terminal determines the second beam, and the latest PDSCH is out of a time window.

In an embodiment, the base station instructs the terminal to use the sub-rule shown in (1-3) above to determine the second beam used for transmitting the first PUSCH using a media access control-control element (MAC-CE) signaling. The terminal acquires a DMRS in the latest PDSCH transmission (the latest PDSCH refers to the latest PDSCH before the terminal determines the second beam) based on an indication of the MAC CE signaling. A beam used by the DMRS is determined by a reference signal indicated by quasi co-location (QCL) information. If the QCL information indicates a synchronization signal block (SSB) 1, the DMRS is transmitted using a transmission beam of SSB 1. The terminal determines the receive beam for receiving SSB1 as the second beam used for transmitting the first PUSCH.

(1-4) the second beam is determined according to a beam of a reference signal in a first CRI report by the terminal; where the first CRI report is used to characterize a latest CRI report before the terminal determines the second beam.

The terminal may determine the second beam used for transmitting the first PUSCH according to a beam of a reference signal in the first CRI report of the terminal.

In an embodiment, the rule predefined by a system includes the second beam is determined according to a beam of a reference signal in a latest CRI report by the terminal (where the latest CRI report refers to a latest CRI report before the terminal determines the second beam). According to the configuration of the base station side, the terminal reports CSI at a time n, and a reported content includes CRI and L1-RSRP (Layer-1 reference signal received power). If the terminal reports multiple sets of CRI and L1-RSRP, it may further agree in the above rules to use the CRI with a largest L1-RSRP to determine a beam of a CSI-RS resource. The base station side schedules the terminal to carry out PUSCH transmission at the time n+K, and there is no CRI report between the time n and the time n+K. In this way, according to the above rule, the terminal determines the CSI-RS resource corresponding to the CRI reported at time n, determines the reception beam receiving the CSI-RS resource as the second beam used at time n+K, and transmits the corresponding PUSCH using the second beam.

(1-5) the second beam is determined according to a beam used by the first RACH; and the first RACH is used to characterize a latest RACH before the terminal determines the second beam;

In one embodiment, the terminal may determine the second beam used for transmitting the first PUSCH based on the beam determination used for the first RACH.

In an embodiment, the base station uses MAC-CE signaling to instruct the terminal determine the second beam used for transmitting the first PUSCH using the sub-rule shown in (1-5) above. The terminal acquires a transmission beam for a latest RACH (the latest RACH refers to the latest RACH before the terminal determines the second beam) based on the MAC CE signaling indication, and determines the transmission beam for the latest RACH as the second beam used for transmitting the first PUCCH.

(1-6) the second beam is determined according to a beam of a predefined second PUSCH.

In particular, the terminal may determine the second beam used for transmitting the first PUSCH according to a beam for a predefined second PUSCH. In one embodiment, the predefined second PUSCH may be a latest PUSCH before the terminal determines the second beam.

In an embodiment, the base station uses MAC-CE signaling to instruct the terminal to determine the second beam used for transmitting the first PUSCH using the sub-rule shown in (1-6) above. The terminal acquires a beam of a latest PUSCH (the latest PUSCH refers to a latest PUSCH before the terminal determines the second beam) based on the MAC CE signaling indication, and determines the beam of the latest PUSCH as the second beam used for transmitting the first PUCCH.

(1-7) the second beam is determined according to a beam of the SRS for determining the transmission beam for PDSCH.

The terminal may determine the second beam used for transmitting the first PUSCH from the beam of the SRS for determining the transmission beam for PDSCH.

In an embodiment, the rule predefined by the system includes that the second beam is determined according to the SRS used for determining the beam for PDSCH transmission. The base station selects a beam of the SRS resource 1 for determining a beam of the PDSCH according to the uplink SRS beam sweeping. The beam of this PDSCH may be indicated by DCI, having indicator field of SRS resource 1. The terminal determines a transmission beam of the SRS resource 1 according to the DCI indicator. Then, the transmission beam of SRS resource 1 is determined as the second beam used for transmitting the first PUSCH according to the sub-rule shown in (1-7) above.

In an embodiment, the base station configures spatial relation information (Spatial Relation Info) of SRS Resource 1 to CORESET1 by RRC (Radio Resource Control), which indicates that the terminal uses a reception beam for receiving CORESET1 to transmit SRS Resource 1. Similarly, the base station configures the spatial relation Info of SRS resource 2 to CORESET2, and configures the spatial relation Info of SRS resource 3 to CORESET 3. After the uplink SRS beam sweeping, at time n, the base station transmits SRS resource 1 indicated by the SRI field in the DCI signaling by, and indicates that the same beam as that used for SRS resource 1 is used for transmitting PUSCH. At the time n+K, the base station transmits SRS resource 3 indicated by the SRI field in the DCI signaling, and will use the same beam as the SRS resource 3, that is, the reception beam for receiving CORESET 3 is determined as the second beam at the time n+K, and the corresponding PUSCH is transmitted using the second beam, and the uplink beam is changed according to different indication information of the DCI.

Similarly, the spatial relation information may also be a downlink DMRS signal, a PDSCH, a PUCCH, or the like.

(1-8) the second beam is determined according to a beam used by the first PUCCH.

The terminal may determine the second beam used for transmitting the first PUSCH from the beam used for the first PUCCH.

In an embodiment, the beam used by the first PUCCH in (1-8) above may include:
 a beam of predefined PUCCH resources; or
 a beam of dynamically scheduled PUCCH resources for feeding back acknowledgement (ACK) information or non-acknowledgement (NACK) information.

In an embodiment, the predefined PUCCH resources include: a fixed PUCCH resource; or a PUCCH resource with index changing according to a specified rule.

In an embodiment, the rule predefined by the system includes that the second beam is determined according to the beam of the PUCCH with a lowest index. The beam of the PUCCH is configured by spatial relation information of RRC signaling, assuming that it is configured as SRS resource 1. The terminal determines the transmission beam of the SRS resource 1 as the second beam used for transmitting the first PUSCH according to the above rule.

After determining the uplink beam or the downlink beam, the second beam used for transmitting the first PUSCH may be determined from the uplink beam or the downlink beam in combination with one or more sub-rules corresponding to the second beam used for transmitting the first PUSCH, and the first PUSCH may be transmitted using the second beam, and accuracy and flexibility in determining the second beam are improved.

Further, based on the foregoing method, the uplink channel in step 120 may include a second PUCCH, and the first beam used for uplink channel transmission includes a third beam used for transmitting the second PUCCH.

When step 120 is performed:
 the third beam used for transmitting the second PUCCH can be determined from the uplink beam or the downlink beam according to the predetermined rule; or
 the third beam used for transmitting a second PUCCH can be determined from the uplink beam or the downlink beam according to first indication information which is configured by the base station for the terminal and used for beam management; or
 the third beam used for transmitting the second PUCCH can be determined from the uplink beam or the downlink beam according to the predetermined rule and the second indication information; the predetermined rule includes multiple sub-rules, and the second indication information configured by the base station for the terminal includes an identifier for indicating that a sub-rule that is in effect.

From the foregoing embodiments, after determining an uplink beam or a downlink beam, a third beam used for transmitting a second PUCCH may be determined from the uplink beam or the downlink beam in combination with a predetermined rule or first indication information configured by the base station for the terminal, and the second PUCCH is transmitted using the third beam, flexible selection of a beam used for PUCCH transmission is improved, and efficiency of uplink channel transmission is further increased.

Further, based on the above method, the predetermined rule or the first indication information corresponding to a third beam used for transmitting the second PUCCH includes one or more sub-rules of the following (1-9) to (1-14):

(1-9) the third beam is determined according to a PDCCH indication.

The terminal may determine PDCCH indication, a third beam used for transmitting the second PUCCH according to the PDCCH indication.

In an embodiment, the base station indicates the transmission beam for PUCCH by DCI signaling. The indication information may be an ID of a reference signal, for example, indicating SRS resource 1. The terminal determines that the transmission beam for the second PUCCH is the same as the beam of the SRS resource 1 according to the indication information, and sends the second PUCCH. The base station side receives the second PUCCH using the reception beam for receiving the SRS resource 1 according to the DCI signaling indication. The receive beams may be obtained by an uplink beam management procedure; or the DCI signaling indicates CSI-RS resource 1. The terminal determines that the transmission beam for the second PUCCH is the same as the reception beam of the CSI-RS resource 1 received by the terminal according to the indication information, and transmits the second PUCCH using the beam. The base station side receives the second PUCCH using the transmission beam for transmitting the CSI-RS resource 1 according to the DCI signaling indication.

DCI is a downlink control signaling, and the signaling is transmitted through the downlink PDCCH channel in (1-9) above.

(1-10) the third beam is determined according to a beam of a PDCCH used for scheduling the second PUCCH.

The terminal may determine a third beam used for transmitting the second PUCCH according to the beam of the PDCCH used for scheduling the second PUCCH.

In an embodiment, the predefined rule includes that the third beam is determined according to a beam of a PDCCH used for scheduling the second PUCCH. The beam of the PDCCH channel is determined by a beam of a reference signal indicated by the TCI status. If the TCI status indicates downlink CSI-RS resource 1, the PDCCH is transmitted using the beam of CSI-RS resource 1:

at time n, the base station side schedules the terminal through a PUCCH channel to feed back hybrid automatic repeat request (HARQ-ACK) information through a PDCCH channel.

The terminal determines a reception beam for receiving the PDCCH according to the predetermined rule, and the beam is the same as the transmission beam of the CSI-RS resource 1 indicated by the TCI state. Further, a reception beam for receiving the PDCCH signal is determined as a third beam used for transmitting the second PUCCH.

The base station side determines that a third beam used for transmitting the second PUCCH is the same as a reception beam for the PDCCH according to the predetermined rule, and determines the third beam used for transmitting the second PUCCH according to the TCI state information of the PDCCH. The third beam is the same as a downlink transmission beam of the CSI-RS resource 1 indicated by the TCI state.

In addition, the above predetermined rule cannot be used for PUCCH without PDCCH scheduling. In this case, a fixed CORESET beam may be used or the beam of the CORESET having the smallest ID number may be also used for determining a third beam used for the transmitting the second PUCCH.

(1-11) the third beam is determined according to a predefined third PUSCH.

In particular, the terminal may determine a third beam used for transmitting the second PUCCH according to a predefined third PUSCH.

In an embodiment, the third PUSCH in (1-11) above may include:
the latest PUSCH before the terminal determines the third beam; or
the latest PUSCH before the terminal determines the third beam, and the latest PUSCH does not exceed a time window.

(1-12) the third beam is determined according to a beam used by a second RACH channel; and the second RACH is used to characterize a latest RACH before the terminal determines the third beam.

The terminal may determine a third beam used for transmitting the second PUCCH according to the beam used for the second RACH.

(1-13) the third beam is determined according to a beam of a second CORESET for PUCCH.

The terminal may determine a third beam used for transmitting the second PUCCH from the beam of the second CORESET for PUCCH.

In an embodiment, the second CORESET in (1-13) above may include:
a fixed CORESET; or
a CORESET with the smallest ID number in a second slot in which a search space is present; and the second slot is used to characterize the latest slot in which the search space is present before the terminal determines the third beam.

In an embodiment, the predetermined rule includes the three sub-rules (1-11), (1-12), and (1-13). In one embodiment, a third beam used for transmitting the second PUCCH is determined according to the latest PUSCH (i.e., the latest PUSCH before the terminal determines the third beam); or according to the beam determination used by the most recent RACH (i.e. the latest RACH before the terminal determines the third beam), or using the beam of the CORESET with the smallest ID number in the most recent slot in which the search space is present (i.e. the latest slot before the terminal determines the third beam).

Further, the base station indicates the sub-rule adopted by the current system through higher layer signaling or physical layer signaling. For example, the beam determination according to the latest PUSCH is instructed by using the MAC-CE, and the second PUCCH is transmitted using the same beam as the PUSCH, the beam of the PUSCH being instructed by the SRI in the DCI signaling, the SRI indicates one SRS resource, and the PUSCH is transmitted using the same beam as the instructed SRS resource.

If the MAC-CE signaling indicates that the determination is performed according to a beam of the latest RACH, the terminal transmits a second PUCCH according to the transmission beam for the latest RACH.

If the MAC-CE signaling indicates that the determination is performed according to the beam of the CORESET with the smallest ID number in the most recent slot in which the search space is present, the terminal determines the most recent slot containing the search space of the PUCCH, determines to receive the reception beam of the CORESET with the smallest ID number in the search space, and uses the reception beam to transmit the second PUCCH according to the configured sub-rule.

(1-14) the third beam is determined according to a beam used by a PDSCH associated with a PUCCH.

The terminal may determine a third beam used for transmitting the second PUCCH according to the beam used for the PDSCH associated with the PUCCH.

In an embodiment, the predetermined rule includes a third beam is determined according to a beam used by a PDSCH associated with the PUCCH. The association represents that the PUCCH is used for transmitting ACK-NACK (acknowledgement-non-acknowledgement) information of the PDSCH. The terminal determines a PDSCH to be fed back with ACK-NACK information, and a beam used by the PDSCH is indicated by a TCI state, for example, the TCI state indicates CSI-RS resource 0. The PDSCH is thus transmitted using the beam of CSI-RS resource 0. The terminal determines a reception beam of the CSI-RS resource 0 according to the predetermined rule, and determines the reception beam as a third beam used for transmitting the second PUCCH.

From the foregoing embodiments, after determining the uplink beam or the downlink beam, a third beam used for transmitting the second PUCCH may be determined from the uplink beam or the downlink beam in combination with one or more sub-rules corresponding to the third beam used for transmitting the second PUCCH, and the second PUCCH is transmitted using the third beam, and accuracy and flexibility in determining the third beam is improved.

Figure 2:
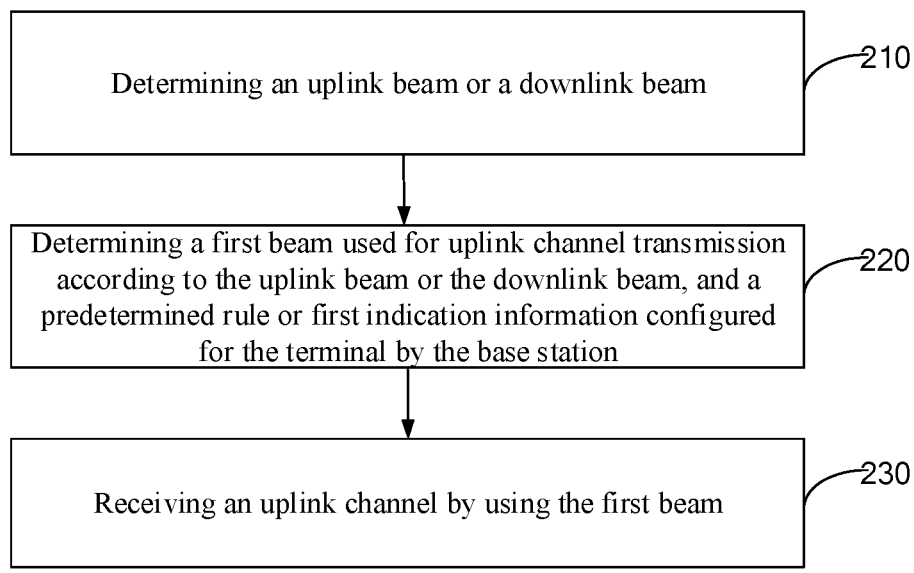
FIG. 2 is a flowchart of a method of an embodiment of the present application.

FIG. 2 is a flowchart of a method of an embodiment of the present application, where the method for transmitting an uplink channel may be performed by a base station. As shown in FIG. 2, the method for transmitting an uplink channel includes the following steps:

step 210: determining an uplink beam or a downlink beam.

The uplink beam may be obtained through uplink beam management and used for downlink data transmission. The uplink beam may include, but not limited to, one or more of the following:

a beam of the most recent RACH;
a predefined beam of PUSCH; and
the beam used by the PUCCH.

The most recent RACH may refer to a latest RACH before the terminal determines a first beam used for uplink channel transmission.

In addition, the downlink beam may be obtained through downlink beam management and used for downlink transmission. The downlink beam may include, but not limited to, one or more of the following:

a beam of a PDCCH;
a beam of downlink CORESET;
a beam of demodulation reference signal (DMRS) in a PDSCH;
a beam of a reference signal in a latest CRI report of a terminal;
a beam used for determining SRS in the PDSCH; and
the beam used by the PDSCH.

The latest CRI report may refer to a latest CRI report before the terminal determines the first beam used for uplink channel transmission.

Step 220: determining a first beam used for uplink channel transmission according to a predetermined rule for beam management or first indication information for beam management configured for the terminal by the base station.

The base station may determine the first beam used for uplink channel transmission from the uplink beam or the downlink beam according to a predetermined rule, or may determine the first beam used for uplink channel transmission from the uplink beam or the downlink beam according to the first indication information configured for the terminal by the base station and used for beam management.

The predetermined rule may be a rule predefined by the system.

The first indication information may be indicated to the terminal by the base station through a dynamic instruction.

The uplink channel may include at least one of a PUSCH and a PUCCH.

Step 230: receiving an uplink channel by using the first beam.

From the foregoing embodiments, after determining an uplink beam or a downlink beam, a first beam used for uplink channel transmission may be determined from the uplink beam or the downlink beam in combination with a predetermined rule or first indication information configured for the terminal by the base station, and an uplink channel is received by using the first beam, the flexibility in selection of beams used for uplink channel transmission is improved, and efficiency of uplink channel transmission is increased.

Further, based on the method, the predetermined rule in step 220 includes one or more sub-rules; and the second indication information configured for the terminal by the base station includes an identifier for indicating a sub-rule that is in effect.

When the first beam used for uplink channel transmission is determined according to the uplink beam or the downlink beam and the predetermined rule in step 220, second indication information configured for the terminal by the base station may be obtained firstly, where the second indication information includes an identifier used for indicating that a sub-rule that is in effect; and the first beam used for uplink channel transmission is determined from the uplink beam or the downlink beam according to the predetermined rule and the second indication information.

For example, the base station determines a sub-rule coming into effect in the predetermined rules according to the second indication information, and determines the first beam used for uplink channel transmission according to the sub-rule coming into effect.

From the above embodiments that, after determining the uplink beam or the downlink beam, the first beam used for uplink channel transmission may be determined from the uplink beam or the downlink beam in combination with the predetermined rule and the second indication information configured for the terminal by the base station, and the uplink channel is received by using the first beam, the selection manners for determining the first beam is enriched and the reliability of uplink channel transmission is improved.

Further, based on the foregoing method, the uplink channel in step 220 may include a first PUSCH, and the first beam used for uplink channel transmission includes a second beam used for transmitting the first PUSCH.

Correspondingly, when step 220 is performed:

the second beam used for transmitting the first PUSCH can be determined from the uplink beam or the downlink beam according to the predetermined rule; or the second beam used by transmitting the first PUSCH can be determined from the uplink beam or the downlink beam according to first indication information for beam management configured for the terminal by the base station; or the second beam used for transmitting the first PUSCH can be determined from the uplink beam or the downlink beam according to the predetermined rule and the second indication information; the predetermined rule includes multiple sub-rules, and the second indication information configured for the terminal by the base station includes an identifier for indicating that a sub-rule come into effect.

From the foregoing embodiments, after determining the uplink beam or the downlink beam, the second beam used for first PUSCH transmission may be determined from the uplink beam or the downlink beam in combination with a predetermined rule or first indication information configured for the terminal by the base station, and the first PUSCH is received using the second beam, flexible selection of a beam used for PUSCH transmission is improved, and efficiency of uplink channel transmission is increased.

Further, based on the above method, the predetermined rule or the first indication information corresponding to the second beam used for transmitting the first PUSCH includes one or more of the following sub-rules:

the second beam is determined according to a beam of a physical downlink control channel (PDCCH) scheduling the first PUSCH;

the second beam is determined according to a beam of a first control resource set (CORESET) for the first PUSCH;

the second beam is determined according to a beam of a demodulation reference signal (DMRS) in a first physical downlink shared channel (PDSCH);

the second beam is determined according to the beam of the reference signal in a first channel state information reference signal resource indicator (CRI) report of the terminal; wherein the first CRI report is used to characterize a latest CRI report before the terminal determines the second beam;

the second beam is determined according to a beam used by a first random access channel (RACH); and the first RACH is used to characterize a latest RACH before the terminal determines the second beam;

the second beam is determined according to a beam of a predefined second PUSCH;

the second beam is determined according to a beam of a sounding reference signal (SRS) used for determining a transmission beam for PDSCH; and the second beam is determined according to a beam used by a first physical uplink control channel (PUCCH).

From the above embodiments, after determining the uplink beam or the downlink beam, the second beam used for transmitting the first PUSCH may be determined from the uplink beam or the downlink beam in combination with one or more sub-rules corresponding to the second beam used for transmitting the first PUSCH, and the first PUSCH is received using the second beam, and accuracy and flexibility in determining the second beam are improved.

Further, based on the foregoing method, the uplink channel in step 220 may include a second PUCCH, and the first beam used for uplink channel transmission includes a third beam used for transmitting the second PUCCH.

Correspondingly, when step 220 is performed:

the third beam used for transmitting the second PUCCH can be determined from the uplink beam or the downlink beam according to the predetermined rule; or the third beam used for transmitting a second PUCCH can be determined from the uplink beam or the downlink beam according to first indication information configured for the terminal by the base station and used for beam management; or the third beam used for transmitting the second PUCCH can be determined from the uplink beam or the downlink beam according to the predetermined rule and the second indication information; the predetermined rule includes multiple sub-rules, and the second indication information configured for the terminal by the base station includes an identifier for indicating that a sub-rule come into effect.

From the foregoing embodiments, after determining an uplink beam or a downlink beam, a third beam used for transmitting a second PUCCH may be determined from the uplink beam or the downlink beam in combination with a predetermined rule or first indication information configured for the terminal by the base station, and the second PUCCH is received using the third beam, flexible selection of a beam used for PUCCH transmission is improved, and efficiency of uplink channel transmission is increased.

Further, based on the above method, the predetermined rule or the first indication information corresponding to a third beam used for transmitting the second PUCCH includes one or more sub-rules of the following:

the third beam is determined according to a PDCCH indication;

the third beam is determined according to a beam of a PDCCH which schedules the second PUCCH;

the third beam is determined according to a predefined third PUSCH;

the third beam is determined according to a beam used by a second RACH; where the second RACH is used to characterize a latest RACH before the terminal determines the third beam; the third beam is determined according to a beam of a second CORESET for the PUCCH; and the third beam is determined according to a beam used by a PDSCH associated with the PUCCH.

From the foregoing embodiments, after determining the uplink beam or the downlink beam, a third beam used for transmitting the second PUCCH may be determined from the uplink beam or the downlink beam in combination with one or more sub-rules corresponding to the third beam used for transmitting the second PUCCH, and the second PUCCH is received by using the third beam, and accuracy and flexibility in determining the third beam are improved.

Figure 3:
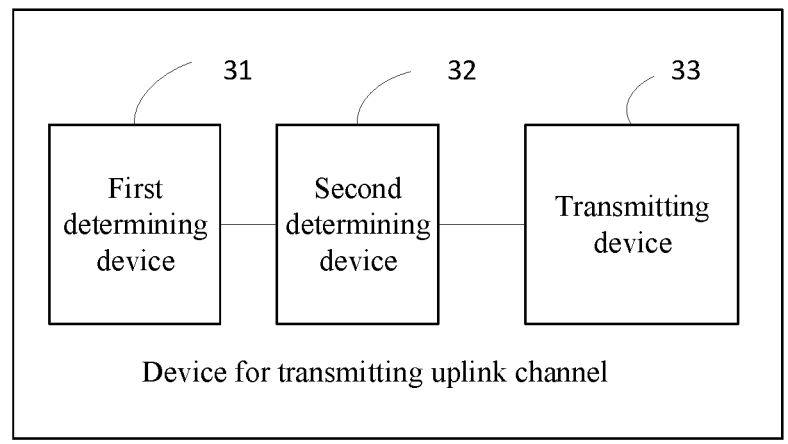
FIG. 3 is a block diagram of a device of an embodiment of the present application.

FIG. 3 is a block diagram of a device of an embodiment of the present application, where the device for transmitting an uplink channel may be used for a terminal; as shown in FIG. 3, the device for transmitting an uplink channel may include:

a first determining device 31, configured to determine an uplink beam or a downlink beam;

a second determining device 32, configured to determine a first beam used for uplink channel transmission according to the uplink beam or the downlink beam, and a predetermined rule or first indication information configured for the terminal by a base station; and a transmitting device 33, configured to transmit an uplink channel by using the first beam.

Further, based on the apparatus, the predetermined rule includes multiple sub-rules; when determining the first beam used for uplink channel transmission according to the uplink beam or the downlink beam and a predetermined rule, the second determining device 32 may include:

a first acquiring subdevice, configured to acquire second indication information configured for the terminal by the base station, where the second indication information includes an identifier used for indicating a sub-rule that is in effect; and a first determining subdevice, configured to determine the first beam used for uplink channel transmission from the uplink beam or the downlink beam according to the predetermined rule and the second indication information.

Further, based on the foregoing apparatus, the uplink channel includes a first physical uplink shared channel (PUSCH), and the first beam includes a second beam used for transmitting the first PUSCH.

Further, based on the above apparatus, the predetermined rule or the first indication information includes one or more sub-rules of the following:
  the second beam is determined according to a beam of a physical downlink control channel (PDCCH) scheduling the first PUSCH;
  the second beam is determined according to a beam of a first control resource set (CORESET);
  the second beam is determined according to a beam of a demodulation reference signal (DMRS) in a first physical downlink shared channel (PDSCH);
  the second beam is determined according to a beam of a reference signal in a first channel state information reference signal resource indicator (CRI) report of the terminal; where the first CRI report is used to characterize a latest CRI report before the terminal determines the second beam;
  the second beam is determined according to a beam used by a first random access channel (RACH); and the first RACH is used to characterize a latest RACH before the terminal determines the second beam;
  the second beam is determined according to a beam of a predefined second PUSCH;
  the second beam is determined according to a beam of a sounding reference signal (SRS) used for determining a transmission beam for PDSCH; and
  the second beam is determined according to a beam used by a first physical uplink control channel (PUCCH).

Further, based on the above apparatus, the first CORESET includes:
  a fixed CORESET; or
  a CORESET with the smallest identification (ID) number in a first slot in which a search space is present; and the first slot is used to characterize the latest slot in which the search space is present before the terminal determines the second beam.

Further, based on the apparatus, the first PDSCH includes:
  a latest PDSCH before the terminal determines the second beam; or
  a latest PDSCH before the terminal determines the second beam, and the latest PDSCH is within a time window; or
  the latest PDSCH before the terminal determines the second beam, and the latest PDSCH is out of a time window.

Further, based on the apparatus, a beam used by the first PUCCH channel includes:
  a beam of a predefined PUCCH resource; or
  a beam of a dynamically scheduled PUCCH resources for feeding back acknowledgement (ACK) information or non-acknowledgement (NACK) information.

Further, based on the above apparatus, the predefined PUCCH resources include:
  a fixed PUCCH resource; or
  a PUCCH resource with a resource index changing according to a specified rule.

Further, based on the device, the uplink channel includes a second PUCCH, and the first beam includes a third beam used for transmitting the second PUCCH.

Further, based on the above device, the predetermined rule or the first indication information includes one or more of the following sub-rules:
  the third beam is determined according to a PDCCH indication;
  the third beam is determined according to a beam of a PDCCH used for scheduling the second PUCCH;
  the third beam is determined according to a predefined third PUSCH;
  the third beam is determined according to a beam used by a second RACH; where the second RACH is used to characterize a latest RACH before the terminal determines the third beam;
  the third beam is determined according to a beam of a second CORESET; and
  the third beam is determined according to a beam used by a PDSCH associated with the PUCCH.

Further, based on the apparatus, the third PUSCH includes:
  a latest PUSCH before the terminal determines the third beam; or
  a latest PUSCH before the terminal determines the third beam, and the latest PUSCH does not exceed a time window.

Further, based on the above apparatus, the second CORESET includes:
  a fixed CORESET; or
  a CORESET with the smallest ID number in a second slot in which a search space is present; where the second slot is used to characterize the latest slot in which the search space is present before the terminal determines the third beam.

The device provided in this embodiment can implement all the method steps that can be implemented by the method embodiment, and can achieve the same beneficial effects, and details of the same contents and beneficial effects in this apparatus embodiment as in the method embodiment are not repeated herein.

Figure 4:
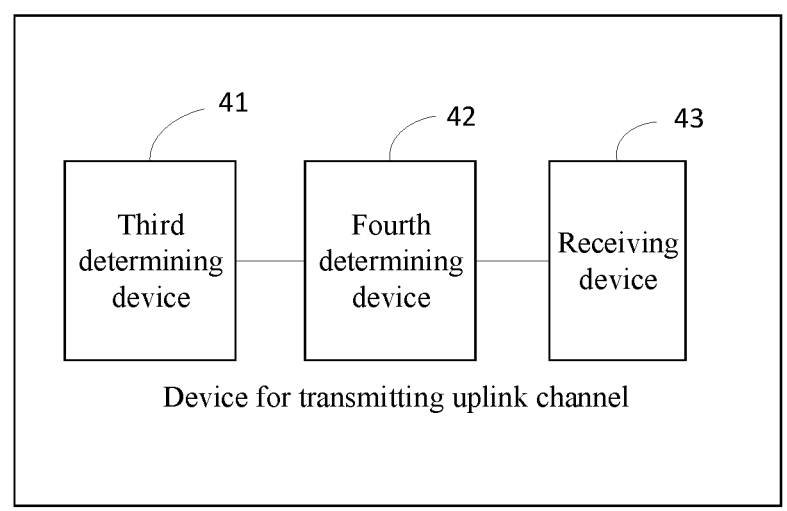
FIG. 4 is a block diagram of a device of an embodiment of the present application.

FIG. 4 is a block diagram of a device of an embodiment of the present application, where the device for transmitting an uplink channel may be used for a base station; as shown in FIG. 4, the device for transmitting an uplink channel may include:
  a third determining device 41, configured to determine an uplink beam or a downlink beam;
  a fourth determining device 42, configured to determine a first beam used for uplink channel transmission according to the uplink beam or the downlink beam, and a predetermined rule or first indication information configured for the terminal by the base station;
  a receiving device 43, configured to receive an uplink channel by using the first beam.

Further, based on the apparatus, the predetermined rule includes multiple sub-rules; when the fourth determining device 42 determines the first beam used for uplink channel transmission according to the uplink beam or the downlink beam, and a predetermined rule, the determining may include:
  a second acquiring subdevice, configured to acquire second indication information configured for the terminal by the base station, where the second indication information includes an identifier used for indicating that a sub-rule that is in effect; and
  a second determining subdevice, configured to determine the first beam used for uplink channel transmission from the uplink beam or the downlink beam according to the predetermined rule and the second indication information.

Further, based on the foregoing apparatus, the uplink channel includes a first physical uplink shared channel (PUSCH), and the first beam includes a second beam used for transmitting the first PUSCH.

Further, based on the above apparatus, the predetermined rule or the first indication information includes one or more sub-rules of the following:

the second beam is determined according to a beam of a physical downlink control channel (PDCCH) for scheduling the first PUSCH;

the second beam is determined according to a beam of a first control resource set (CORESET);

the second beam is determined according to a beam of a demodulation reference signal (DMRS) in a first physical downlink shared channel (PDSCH);

the second beam is determined according to a beam of a reference signal in a first channel state information reference signal resource indicator (CRI) report of the terminal; and the first CRI report is used to characterize a latest CRI report before the terminal determines the second beam;

the second beam is determined according to a beam used by a first random access channel (RACH); where the first RACH is used to characterize a latest RACH before the terminal determines the second beam;

the second beam is determined according to a beam of a predefined second PUSCH;

the second beam is determined according to a beam of a sounding reference signal (SRS) used for determining a transmission beam for PDSCH;

the second beam is determined according to a beam used by a first physical uplink control channel (PUCCH).

Further, based on the apparatus, the uplink channel includes a second PUCCH, and the first beam includes a third beam used for transmitting the second PUCCH.

Further, based on the above apparatus, the predetermined rule or the first indication information includes one or more of the following sub-rules:

the third beam is determined according to a PDCCH indication;

the third beam is determined according to a beam of a PDCCH used for scheduling the second PUCCH;

the third beam is determined according to a predefined third PUSCH;

the third beam is determined according to a beam used by a second RACH; where the second RACH is used to characterize a latest RACH before the terminal determines the third beam;

the third beam is determined according to a beam of a second CORESET; and the third beam is determined according to a beam used by a PDSCH associated with the PUCCH.

The device according to this embodiment can perform all the method steps that can be implemented by the method embodiment, and can achieve the same beneficial effects, and details of the same contents and beneficial effects in this apparatus embodiment as in the method embodiment are not repeated herein.

Figure 5:
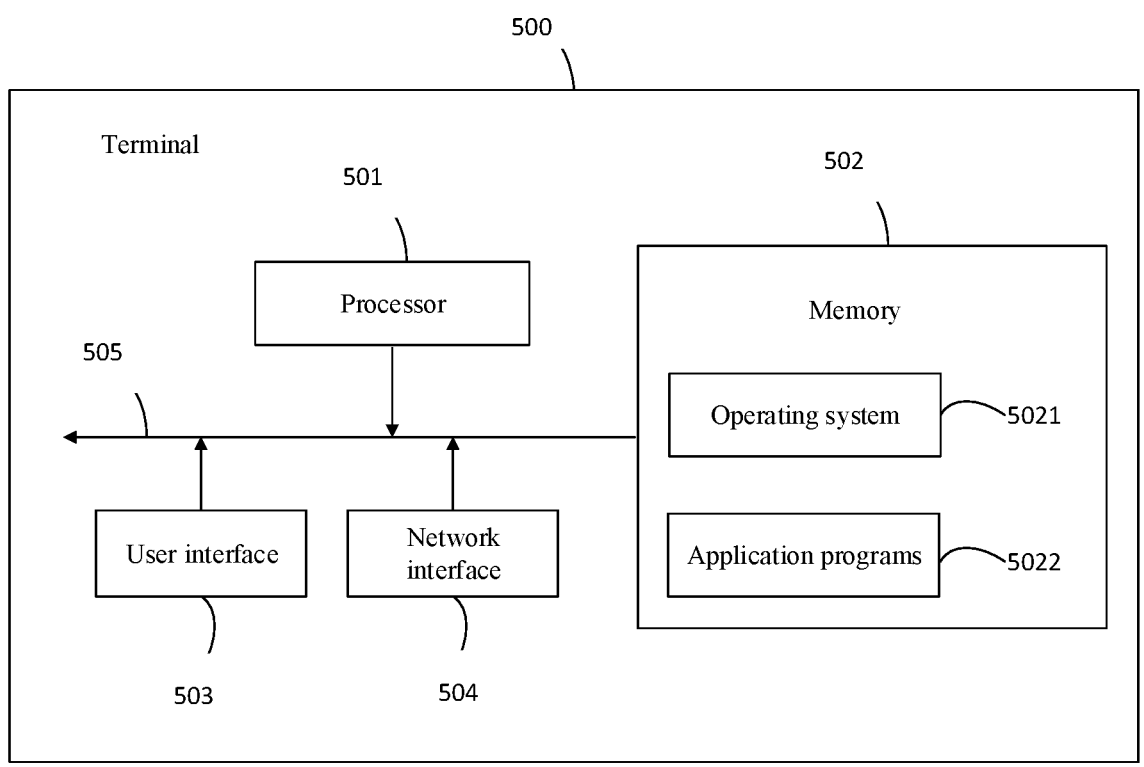
FIG. 5 is a schematic structural diagram of a terminal according to an embodiment of the present application.

FIG. 5 is a schematic structural diagram of a terminal according to an embodiment of the present application, and as shown in FIG. 5, the terminal 500 may include: at least one processor 501, memory 502, at least one network interface 504, and other user interfaces 503. The various components in terminal 500 are coupled together by a bus system 505. It is understood that the bus system 505 is used to enable connection communications between these components. The bus system 505 includes a power bus, a control bus, and a status signal bus in addition to a data bus. For clarity of illustration, however, the various buses are labeled as bus system 505 in FIG. 5.

The user interface 503 may include a display, a keyboard, or a pointing apparatus, such as a mouse, a trackball, a touchpad, or a touch screen.

It will be appreciated that the memory 502 in the embodiments of the present application can be either volatile memory or nonvolatile memory, or can include both volatile and nonvolatile memory. The nonvolatile memory may be a read-only memory (ROM), a programmable ROM (PROM), an erasable PROM (EPROM), an electrically erasable PROM (EEPROM), or a flash memory. The volatile memory may be a random-access memory (RAM) which serves as an external cache. By way of example, and not limitation, many forms of RAM are available, such as static random-access memory (SRAM), dynamic random-access memory (DRAM), synchronous dynamic random-access memory (SDRAM), double data rate synchronous dynamic random access memory (DDR SDRAM), enhanced synchronous SDRAM (ESDRAM), synchronous link DRAM (SL-DRAM), and direct Rambus RAM (DRRAM). The memory 502 of the systems and methods described in connection with the various embodiments of the subject application is intended to include, but not limited to, these and any other suitable types of memory.

In some embodiments, memory 502 stores elements, executable modules or data structures, or a subset or expanded set of them, such as: an operating system 5021 and application programs 5022.

The operating system 5021 includes various system programs, such as a framework layer, a core library layer, a driver layer, and the like, and is used for implementing various basic services and processing hardware-based tasks. The application programs 5022 include various application programs such as a media player, a browser, etc., for implementing various application services. A program for implementing the method according to the embodiment of the present application may be included in the application 5022.

In this embodiment, by calling a computer program or instruction stored in the memory 502, a computer program or instruction stored in the application 5022, the processor 501 is configured to:

determine an uplink beam or a downlink beam;

determine a first beam used for uplink channel transmission according to the uplink beam or the downlink beam, and a predetermined rule or first indication information configured for the terminal by the base station; and transmit an uplink channel by using the first beam.

The method disclosed in the embodiments of the present application may be applied to the processor 501, or implemented by the processor 501. The processor 501 may be an integrated circuit chip having signal processing capabilities. In implementation, the steps of the above method may be performed by integrated logic circuits of hardware or instructions in software form in the processor 501. The processor 501 may be a general-purpose processor, a digital signal processor (DSP), an application specific integrated circuit (ASIC), a field programmable gate array (FPGA) or other programmable logic apparatus, discrete gate or transistor logic, or discrete hardware components. The various methods, steps, and logic blocks disclosed in the embodiments of the present application may be implemented or performed. A general-purpose processor may be a microprocessor, or the processor may be any conventional processor or the like. The steps of the method disclosed in connection with the embodiments of the present application may be directly implemented by a hardware decoding processor, or implemented by a combination of hardware and software modules in the decoding processor. The software modules may be located in ram, flash, ROM, PROM, or EPROM, registers, etc. as is well known in the art. The storage medium is located in the memory 502, and the processor 501 reads the information in the memory 502 and completes the steps of the method in combination with the hardware.

It should be noted that the embodiments described herein may be implemented in hardware, software, firmware, middleware, microcode, or a combination thereof. For a hardware implementation, the Processing units may be implemented within one or more application specific integrated circuits (ASIC), digital signal processor (DSP), digital signal processing device (DSPD), programmable logic device (PLD), field programmable gate array (FPGA), general purpose processors, controllers, micro-controllers, microprocessors, other electronic units designed to perform the functions described herein, or a combination thereof.

For a software implementation, the techniques described may be implemented with modules (e.g., procedures, functions, and so on) that perform the functions described in the embodiments of the application. The software codes may be stored in a memory and executed by a processor. The memory may be implemented within the processor or external to the processor.

According to another embodiment, the predetermined rule includes multiple sub-rules;
the determining the first beam used for uplink channel transmission according to the uplink beam or the downlink beam, and a predetermined rule, includes:
acquiring second indication information configured for the terminal by the base station, where the second indication information includes an identifier used for indicating a sub-rule that is in effect; and
determining the first beam used for uplink channel transmission from the uplink beam or the downlink beam according to the predetermined rule and the second indication information.

According to another embodiment, the uplink channel includes a first PUSCH, and the first beam includes a second beam used for transmitting the first PUSCH.

According to another embodiment, the predetermined rule or the first indication information includes one or more of the following sub-rules:
the second beam is determined according to a beam of a PDCCH used for scheduling the first PUSCH;
the second beam is determined according to a beam of a first control resource set (CORESET);
the second beam is determined according to a beam of a DMRS in a first PDSCH;
the second beam is determined according to a beam of a reference signal in a first CSI-RS resource indicator (CRI) report of the terminal; where the first CRI report is used to characterize a latest CRI report before the terminal determines the second beam;
the second beam is determined according to a beam used by a first random access channel (RACH); where the first RACH is used to characterize a latest RACH before the terminal determines the second beam;
the second beam is determined according to a beam of a predefined second PUSCH;
the second beam is determined according to a beam of a sounding reference signal (SRS) used for determining a transmission beam for PDSCH; and
the second beam is determined according to a beam used by a first physical uplink control channel (PUCCH).

According to another embodiment, the first CORESET includes:
a fixed CORESET; or
a CORESET with the smallest identification (ID) number in a first slot in which a search space is present; and the first slot is used to characterize the latest slot in which the search space is present before the terminal determines the second beam.

According to another embodiment, the first PDSCH includes:
a latest PDSCH before the terminal determines the second beam; or
a latest PDSCH before the terminal determines the second beam, and the latest PDSCH is in a time window; or
a latest PDSCH before the terminal determines the second beam, and the latest PDSCH is out of a time window.

According to another embodiment, the processor 501 is further configured to:
the beam used by the first PUCCH channel includes:
a beam of a predefined PUCCH resource; or
a beam of a dynamically scheduled PUCCH resource for feeding back acknowledgement (ACK) information or non-acknowledgement (NACK) information.

According to another embodiment, the predefined PUCCH resources include:
a fixed PUCCH resource; or
a PUCCH resource with a resource index changing according to a specified rule.

According to another embodiment, the uplink channel includes a second PUCCH, and the first beam includes a third beam used for transmitting the second PUCCH.

According to another embodiment, the predetermined rule or the first indication information includes one or more sub-rules of:
the third beam is determined according to a PDCCH indication;
the third beam is determined according to a beam of a PDCCH used for scheduling the second PUCCH;
the third beam is determined according to a predefined third PUSCH;
the third beam is determined according to a beam used by a second RACH channel; and the second RACH is used to characterize a latest RACH before the terminal determines the third beam;
the third beam is determined according to a beam of a second CORESET; and
the third beam is determined according to a beam used by a PDSCH associated with the PUCCH.

According to another embodiment, the third PUSCH includes:
a latest PUSCH before the terminal determines the third beam; or
a latest PUSCH before the terminal determines the third beam, and the latest PUSCH does not exceed a time window.

According to another embodiment, the second CORESET includes:
a fixed CORESET; or
a CORESET with the smallest ID number in a second slot in which a search space is present; and the second slot is used to characterize the latest slot in which the search space is present before the terminal determines the third beam.

The terminal provided by the embodiment of the present application can implement each process implemented by the terminal in the foregoing embodiments, and is not described here again to avoid repetition.

From the foregoing embodiments, after determining an uplink beam or a downlink beam, a first beam used for uplink channel transmission may be determined from the uplink beam or the downlink beam in combination with a predetermined rule or first indication information configured for the terminal by the base station, and an uplink channel is transmitted by using the first beam, the flexibility in selection of beams used for uplink channel transmission is improved, and efficiency of uplink channel transmission is increased.

Figure 6:
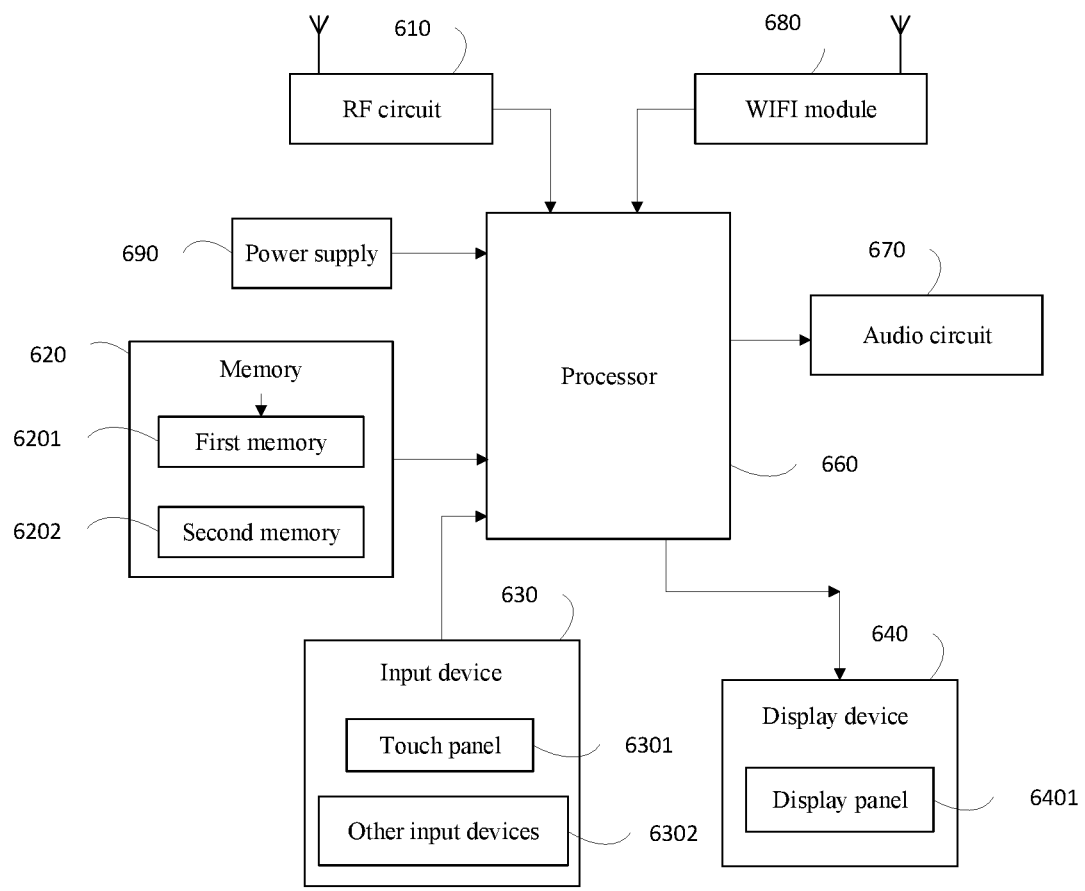
FIG. 6 is a schematic structural diagram of another terminal according to an embodiment of the present application.

FIG. 6 is a schematic structural diagram of another terminal according to an embodiment of the present application, where the terminal in FIG. 6 may be a mobile phone, a tablet computer, a personal digital assistant (PDA), an electronic reader, a handheld game machine, a point of sales (POS), a vehicle-mounted electronic apparatus (vehicle-mounted computer), or the like. As shown in FIG. 6, the terminal includes a radio frequency (RF) circuit 610, a memory 620, an input unit 630, a display unit 640, a processor 660, an audio circuit 670, a WIFI (wireless fidelity) device 680, and a power supply 690. The handset configuration shown in FIG. 6 is not intended to be limiting and may include more or fewer components than those shown, or may combine some components, or split other components, or arranged in different components.

The input unit 630 may be used to receive numeric or character information input by a user and to generate signal inputs related to user settings and function control of the terminal. In the embodiment of the present application, the input device 630 may include a touch panel 6301. The touch panel 6301, also called a touch screen, may collect touch operations performed by a user on or near the touch panel 6301 (e.g., operations performed by the user on the touch panel 6301 by using a finger, a stylus, or any other suitable object or accessory), and drive the corresponding connection apparatus according to a preset program. In one embodiment, the touch panel 6301 may include two parts, i.e., a touch detection apparatus and a touch controller. The touch detection apparatus detects the touch direction of a user, detects a signal brought by touch operation and transmits the signal to the touch controller; the touch controller receives touch information from the touch sensing apparatus, converts the touch information into touch point coordinates, sends the touch point coordinates to the processor 660, and can receive and execute commands transmitted by the processor 660. In addition, the touch panel 6301 may be implemented in various types such as a resistive type, a capacitive type, an infrared ray, and a surface acoustic wave. The input device 630 may include other input devices 6302 in addition to the touch panel 6301, and the other input devices 6302 may be used to receive input numeric or character information and generate key signal inputs related to user settings and function control of the terminal. In particular, other input devices 6302 may include, but not limited to, one or more of a physical keyboard, function keys (such as volume control keys, switch keys, etc.), a trackball, a mouse, a joystick, a light mouse (a light mouse is a touch-sensitive surface that does not display visual output, or is an extension of a touch-sensitive surface formed by a touch screen), and the like.

The display device 640 may be used to display information input by a user or information provided to the user and various menu interfaces of the terminal. The display device 640 may include a display panel 6401. The display panel 6401 may be configured as, for example, a liquid crystal display (LCD) or an organic light emitting diode (OLED).

It should be noted that the touch panel 6301 may cover the display panel 6401 to form a touch display screen, and when the touch display screen detects a touch operation on or near the touch display screen, the touch operation is transmitted to the processor 660 to determine the type of the touch event, and then the processor 660 provides a corresponding visual output on the touch display screen according to the type of the touch event.

The touch display screen includes an application program interface display area and a common control display area. The arrangement of the application program interface display area and the common control display area is not limited, and may be an arrangement that can distinguish two display areas, such as an up-down arrangement, a left-right arrangement, and the like. The application interface display area may be used to display an interface of an application. Each interface may contain at least one application icon and/or widget desktop control or like interface element. The application interface display area may also be an empty interface that does not include any content. The common control display area is used for displaying controls with high utilization rate, such as application icons like setting buttons, interface numbers, scroll bars and phone book icons.

RF circuit 610 may be used for receiving and transmitting signals during a message transmission or a call, and in particular, may be configured to receive downlink information from a network side and provide the received downlink information to processor 660 for processing; in addition, the data for designing the uplink is transmitted to the network side. In general, RF circuit 610 includes, but not limited to, an antenna, at least one amplifier, a transceiver, a coupler, a low noise amplifier (LNA), a duplexer, and the like. In addition, the RF circuitry 610 may also communicate with networks and other apparatus via wireless communications. The wireless communication may use any communication standard or protocol, including, but not limited to, a global system for mobile communication (GSM), a general packet radio service (GPRS), code division multiple access (CDMA), a wideband code division multiple access (WCDMA), a long-term evolution (LTE), email, a short messaging service (SMS), and the like.

The memory 620 is used to store software programs and modules, and the processor 660 executes various functional applications and data processing of the terminal by operating the software programs and modules stored in the memory 620. The memory 620 may mainly include a storage program area and a storage data area, where the storage program area may store an operating system, an application program required by at least one function (such as a sound playing function, an image playing function, etc.), and the like; the storage data area may store data (such as audio data, a phonebook, etc.) created according to the use of the terminal, etc. Further, the memory 620 may include high-speed random-access memory, and may also include non-volatile memory, such as at least one magnetic disk storage apparatus, flash memory apparatus, or other volatile solid state storage apparatus.

The processor 660 is a control center of the terminal, is connected to various parts of the entire mobile phone by using various interfaces and lines, and executes various functions of the terminal and processes data by running or executing software programs and/or modules stored in the first memory 6201 and calling data stored in the second memory 6202, to monitor the terminal. In an embodiment, processor 660 may include one or more processing units.

In this embodiment, the processor 660, by invoking software programs and/or modules stored in the first memory 6201 and/or data in the second memory 6202, is configured to:
  determine an uplink beam or a downlink beam;
  determine a first beam used for uplink channel transmission according to the uplink beam or the downlink beam, and a predetermined rule or first indication information configured for the terminal by the base station; and
  transmit an uplink channel by using the first beam.

According to another embodiment, the predetermined rule includes multiple sub-rules;
  the determining the first beam used for uplink channel transmission according to the uplink beam or the downlink beam, and a predetermined rule, includes:
  acquiring second indication information configured for the terminal by the base station, where the second indication information includes an identifier used for indicating a sub-rule that is in effect; and
  determining the first beam used for uplink channel transmission from the uplink beam or the downlink beam according to the predetermined rule and the second indication information.

According to another embodiment, the uplink channel includes a first physical uplink shared channel (PUSCH), and the first beam includes a second beam used for transmitting the first PUSCH.

According to another embodiment, the predetermined rule or the first indication information includes one or more of the following sub-rules:
  the second beam is determined according to a beam of a physical downlink control channel (PDCCH) scheduling the first PUSCH;
  the second beam is determined according to a beam of a first control resource set (CORESET);
  the second beam is determined according to a beam of a demodulation reference signal (DMRS) in a first physical downlink shared channel (PDSCH);
  the second beam is determined according to a beam of a reference signal in a first channel state information reference signal resource indicator (CRI) report of the terminal; and the first CRI report is used to characterize a latest CRI report before the terminal determines the second beam;
  the second beam is determined according to a beam used by a first random access channel (RACH); and the first RACH is used to characterize a latest RACH before the terminal determines the second beam;
  the second beam is determined according to a beam of a predefined second PUSCH;
  the second beam is determined according to a beam of a sounding reference signal (SRS) used for determining a transmission beam for PDSCH; and
  the second beam is determined according to a beam used by a first physical uplink control channel (PUCCH).

According to another embodiment, the first CORESET includes:
  a fixed CORESET; or
  a CORESET with the smallest identification (ID) number in a first slot in which a search space is present; and the first slot is used to characterize the latest slot in which the search space is present before the terminal determines the second beam.

According to another embodiment, the first PDSCH includes:
  a latest PDSCH before the terminal determines the second beam; or
  a latest PDSCH before the terminal determines the second beam, and the latest PDSCH is within a time window; or
  a latest PDSCH before the terminal determines the second beam, and the latest PDSCH is out of a time window.

According to another embodiment, the beam used by the first PUCCH channel includes:
  a beam of a predefined PUCCH resources; or
  a beam of a dynamically scheduled PUCCH resources for feeding back acknowledgement (ACK) or non-acknowledgement (NACK) information.

According to another embodiment, the predefined PUCCH resources include:
  a fixed PUCCH resource; or
  a PUCCH resource with a resource index changing according to a specified rule.

According to another embodiment, the uplink channel includes a second PUCCH, and the first beam includes a third beam used for transmitting the second PUCCH.

According to another embodiment, the processor 660 is further configured to:
  the predetermined rule or the first indication information includes one or more sub-rules of:
  the third beam is determined according to a PDCCH indication;
  the third beam is determined according to a beam of a PDCCH which schedules the second PUCCH;
  the third beam is determined according to a predefined third PUSCH;
  the third beam is determined according to a beam used by a second RACH channel; and the second RACH is used to characterize a latest RACH before the terminal determines the third beam;
  the third beam is determined according to a beam of a second CORESET; and
  the third beam is determined according to a beam used by a PDSCH associated with the PUCCH.

According to another embodiment, the third PUSCH includes:
  a latest PUSCH before the terminal determines the third beam; or
  a latest PUSCH before the terminal determines the third beam, and the latest PUSCH does not exceed a time window.

According to another embodiment, the second CORESET includes:
  a fixed CORESET; or
  a CORESET with the smallest ID number in a second slot in which a search space is present; and the second slot is used to characterize the latest slot in which the search space is present before the terminal determines the third beam.

The terminal provided by the embodiment of the present application can implement each process implemented by the terminal in the foregoing embodiments, and is not described here again to avoid repetition.

From the foregoing embodiments, after determining an uplink beam or a downlink beam, a first beam used for uplink channel transmission may be determined from the uplink beam or the downlink beam in combination with a predetermined rule or first indication information configured for the terminal by the base station, and an uplink channel is transmitted by using the first beam, and the flexibility in selection of beams used for uplink channel transmission is improved, and efficiency of uplink channel transmission is also improved.

Figure 7:
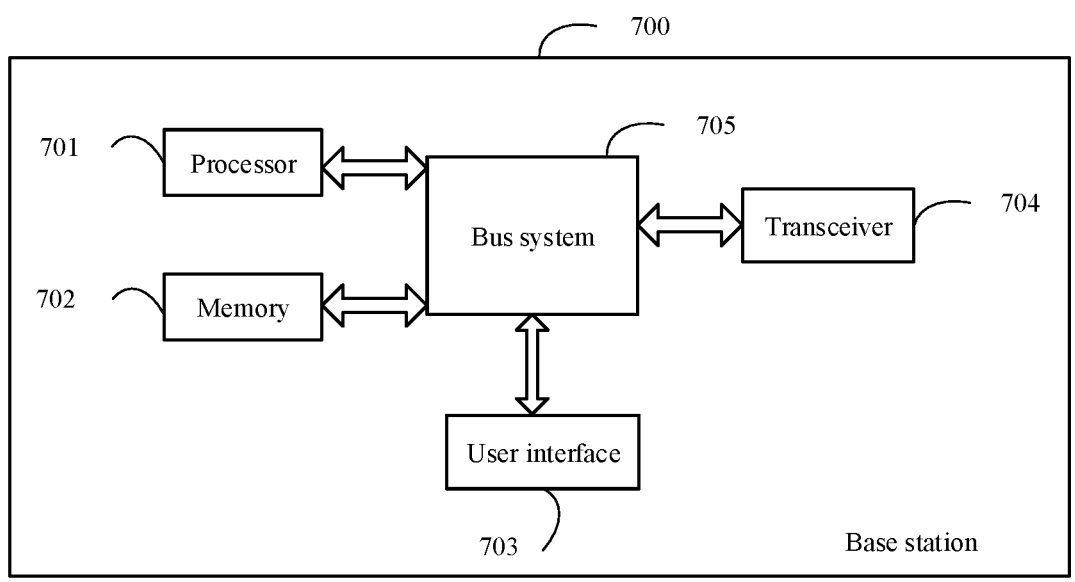
FIG. 7 is a schematic structural diagram of a base station according to an embodiment of the present application.

FIG. 7 is a schematic structural diagram of a base station according to an embodiment of the present application, and as shown in FIG. 7, the base station 700 may include at least one processor 701, a memory 702, at least one other user interface 703, and a transceiver 704. The various components in the base station 700 are coupled together by a bus system 705. It is understood that the bus system 705 is used to enable connected communication between these components. The bus system 705 includes a power bus, a control bus, and a status signal bus in addition to a data bus. For clarity of illustration, the various buses are designated in FIG. 7 as the bus system 705, which may include any number of interconnected buses and bridges, with one or more processors, represented by the processor 701, and various circuits, represented by the memory 702, being linked together. The bus system may also link together various other circuits such as peripherals, voltage regulators, power management circuits, and the like, which are well known in the art, and therefore, will not be described any further in this application. The bus interface provides an interface. The transceiver 704 may be one or more elements including a transmitter and a receiver that provide a means for communicating with various other apparatus over a transmission medium. For different user apparatus, the user interface 703 may also be an interface for interfacing externally to a desired apparatus, including but not limited to a keypad, display, speaker, microphone, joystick, etc.

It will be appreciated that the memory 702 in the present embodiment can be either volatile memory or nonvolatile memory, or can include both volatile and nonvolatile memory. The nonvolatile memory may be a read-only memory (ROM), a programmable ROM (PROM), an erasable PROM (EPROM), an electrically erasable PROM (EEPROM), or a flash memory. The volatile memory may be a random-access memory (RAM) which serves as an external cache. By way of example, and not limitation, many forms of RAM are available, such as static random-access memory (SRAM), dynamic random-access memory (DRAM), synchronous dynamic random-access memory (SDRAM), double data rate synchronous dynamic random access memory (DDR SDRAM), enhanced synchronous SDRAM (ESDRAM), synchronous link DRAM (SLDRAM), and direct Rambus RAM (DRRAM). The memory 702 of the systems and methods described in the various embodiments herein is intended to include, without being limited to, these and any other suitable types of memory.

The processor 701 is responsible for managing the bus system and general processing, and the memory 702 may store computer programs or instructions used by the processor 701 in performing operations, in particular, the processor 701 may be configured to:

determine an uplink beam or a downlink beam;

determine a first beam used for uplink channel transmission according to the uplink beam or the downlink beam, and a predetermined rule or first indication information configured for the terminal by the base station; and receive an uplink channel by using the first beam.

The method disclosed in the embodiments of the present application may be applied to the processor 701, or implemented by the processor 701. The processor 701 may be an integrated circuit chip having signal processing capabilities. In implementation, the steps of the above method may be implemented by integrated logic circuits of hardware or instructions in the form of software in the processor 701. The processor 701 may be a general-purpose processor, a digital signal processor (DSP), an application specific integrated circuit (ASIC), a field programmable gate array (FPGA) or other programmable logic apparatus, discrete gate or transistor logic, or discrete hardware components. The various methods, steps, and logic blocks disclosed in the embodiments of the present application may be implemented or performed. A general-purpose processor may be a microprocessor, or the processor may be any conventional processor or the like. The steps of the method disclosed in connection with the embodiments of the present application may be directly implemented by a hardware decoding processor, or implemented by a combination of hardware and software modules in the decoding processor. The software modules may be located in RAM, flash, ROM, PROM, or EPROM, registers, etc. as is well known in the art. The storage medium is located in the memory 702, and the processor 701 reads the information in the memory 702, and completes the steps of the method in combination with the hardware.

It is to be understood that the embodiments described herein may be implemented in hardware, software, firmware, middleware, microcode, or a combination thereof. For a hardware implementation, the Processing units may be implemented within one or more application specific integrated circuits (ASIC), a digital signal processor (DSP), a digital signal processing device (DSPD), a programmable logic device (PLD), a field programmable gate array (FPGA), general purpose processors, controllers, microcontrollers, microprocessors, other electronic units designed to perform the functions described herein, or a combination thereof.

For a software implementation, the techniques described may be implemented with modules (e.g., procedures, functions, and so on) that perform the functions described in the embodiments of the application. The software codes may be stored in a memory and executed by a processor. The memory may be implemented within the processor or external to the processor.

According to another embodiment, the predetermined rule includes multiple sub-rules;
the determining the first beam used for uplink channel transmission according to the uplink beam or the downlink beam, and a predetermined rule, includes:
acquiring second indication information configured for the terminal by the base station, where the second indication information includes an identifier used for indicating a sub-rule that is in effect; and
determining the first beam used for uplink channel transmission from the uplink beam or the downlink beam according to the predetermined rule and the second indication information.

According to another embodiment, the uplink channel includes a first physical uplink shared channel (PUSCH), and the first beam includes a second beam used for transmitting the first PUSCH.

According to another embodiment, the predetermined rule or the first indication information includes one or more of the following sub-rules:
the second beam is determined according to a beam of a physical downlink control channel (PDCCH) scheduling the first PUSCH;
the second beam is determined according to a beam of a first control resource set (CORESET);

the second beam is determined according to a beam of a demodulation reference signal (DMRS) in a first physical downlink shared channel (PDSCH);

the second beam is determined according to a beam of a reference signal in a first channel state information reference signal resource indicator (CRI) report of the terminal; where the first CRI report is used to characterize a latest CRI report before the terminal determines the second beam;

the second beam is determined according to a beam used by a first random access channel (RACH); where the first RACH is used to characterize a latest RACH before the terminal determines the second beam;

the second beam is determined according to a beam of a predefined second PUSCH;

the second beam is determined according to a beam of a sounding reference signal (SRS) used for determining a transmission beam for PDSCH; and the second beam is determined according to a beam used by a first physical uplink control channel (PUCCH).

According to another embodiment, the uplink channel includes a second PUCCH, and the first beam includes a third beam used for transmitting the second PUCCH.

According to another embodiment, the predetermined rule or the first indication information includes one or more sub-rules of:

the third beam is determined according to a PDCCH indication;

the third beam is determined according to a beam of a PDCCH used for scheduling the second PUCCH;

the third beam is determined according to a predefined third PUSCH;

the third beam is determined according to a beam used by a second RACH channel; where the second RACH is used to characterize a latest RACH before the terminal determines the third beam;

the third beam is determined according to a beam of a second CORESET; and the third beam is determined according to a beam used by a PDSCH associated with the PUCCH.

The base station provided in the embodiment of the present application can implement each process implemented by the base station in the foregoing embodiments, and is not described here again to avoid repetition.

From the foregoing embodiments, after determining an uplink beam or a downlink beam, a first beam used for uplink channel transmission may be determined from the uplink beam or the downlink beam in combination with a predetermined rule or first indication information configured for the terminal by the base station, and an uplink channel is received by using the first beam, the flexibility in selection of beams used for uplink channel transmission is improved, and efficiency of uplink channel transmission is increased.

The above mainly introduces the solutions provided in the embodiments of the present application from the perspective of the base station. It is to be understood that, in order to implement the above functions, the base station provided in the embodiments of the present application includes a hardware structure and/or a software module for performing each function. The various illustrative elements and algorithm steps described in connection with the embodiments disclosed herein may be implemented as hardware or combinations of hardware and computer software.

Whether a function is performed in hardware or computer software drives hardware depends upon the particular application and design constraints imposed on the solution. The described functionality may be implemented in varying ways for each particular application, but such implementation decisions should not be interpreted as causing a departure from the scope of the present application.

In the embodiment of the present application, the base station and the like may be divided into functional modules according to the method example, for example, each functional module may be divided corresponding to each function, or two or more functions may be integrated into one processing module. The integrated module can be realized in a hardware mode, and can also be realized in a software functional module mode.

It should be noted that, in the embodiment of the present application, the division of the module is schematic, and is only one logic function division, and another division manner may be available in actual implementation.

For convenience and simplicity of description, the above division of each functional module is only used for illustration, and in practical applications, the above function distribution may be performed by different functional modules as needed, that is, the internal structure of the apparatus is divided into different functional modules to perform all or part of the above-described functions. For the specific working processes of the system, the apparatus and the unit described above, reference may be made to the corresponding processes in the foregoing method embodiments, and details are not described here again.

In the several embodiments according to the present application, it should be understood that the disclosed apparatus and method may be implemented in other manners. For example, the above-described device embodiments are merely illustrative, and for example, the division of the modules or units is only one type of logical functional division, and other divisions may be realized in practice, for example, multiple units or components may be combined or integrated into another system, or some features may be omitted, or not executed. In addition, the shown or discussed coupling or direct coupling or communication connection between each other may be an indirect coupling or communication connection through some interfaces, apparatus or units.

The units described as separate parts may or may not be physically separate, and parts displayed as units may or may not be physical units, may be located in one position, or may be distributed on multiple network units. Some or all of the units can be selected according to actual needs to achieve the purpose of the solution of the embodiment.

In addition, functional units in the embodiments of the present application may be integrated into one processing unit, or each unit may exist alone physically, or two or more units are integrated into one unit. The integrated unit may be implemented in the form of a software functional unit.

The integrated unit, if implemented in the form of a software functional unit and sold or used as a stand-alone product, may be stored in a computer readable storage medium. All or part of the solution can be embodied in the form of a software product, which is stored in a storage medium and includes several instructions to enable a computer apparatus (which may be a personal computer, a server, or a network apparatus) or a processor to execute all or part of the steps of the method according to the embodiments of the present application. The computer storage medium is a non-transitory medium, including various media that can store program code, such as flash memory, removable hard drive, read-only memory, random-access memory, magnetic or optical disk, etc.

In one embodiment of the present application further provides a non-transitory computer-readable storage medium storing a computer program, where the computer program, when executed by a processor, causes the processor to perform the method provided by the foregoing embodiments, and the method includes:
    determining an uplink beam or a downlink beam;
    determining a first beam used for uplink channel transmission according to the uplink beam or the downlink beam, and a predetermined rule or first indication information configured for the terminal by the base station; and
    transmitting an uplink channel by using the first beam.

In one embodiment of the present application further provides a non-transitory computer-readable storage medium storing a computer program, where the computer program, when executed by a processor, causes the processor to perform the method provided by the foregoing embodiments, and the method includes:
    determining an uplink beam or a downlink beam;
    determining a first beam used for uplink channel transmission according to the uplink beam or the downlink beam, and a predetermined rule or first indication information configured for the terminal by the base station; and
    receiving an uplink channel by using the first beam.

Finally, it should be noted that: the above embodiments are only used to illustrate the solutions of the present application, and not to limit the same; although the present application has been described in detail with reference to the foregoing embodiments, and the solutions described in the foregoing embodiments may still be modified, or some features may be equivalently replaced; and such modifications or substitutions do not depart from the spirit and scope of the corresponding solutions of the embodiments of the present application.

What is claimed is:

1. A method for transmitting an uplink channel, performed by a terminal, comprising:
    determining an uplink beam or a downlink beam;
    determining a first beam used for uplink channel transmission according to the uplink beam or the downlink beam, and a predetermined rule or first indication information configured for the terminal by a base station; and
    transmitting the uplink channel by using the first beam;
    wherein the uplink beam comprises one or more of the following: a beam of a latest random access channel, RACH; or a predefined beam of a physical uplink shared channel, PUSCH; and
    the downlink beam comprises one or more of the following: a beam of a physical downlink control channel, PDCCH; a beam of a downlink control resource set, CORESET; a beam of a physical downlink shared channel, PDSCH; a beam of a reference signal in a latest channel state information reference signal resource indicator, CRI, report by a terminal; or a beam used for determining sounding reference signal, SRS, in downlink PDSCH.

2. The method of claim 1, wherein the predetermined rule comprises multiple sub-rules; and
    the determining the first beam used for uplink channel transmission according to the uplink beam or the downlink beam, and a predetermined rule, comprises:
    acquiring second indication information configured for the terminal by the base station, wherein the second indication information comprises an identifier used for indicating a sub-rule that is in effect; and
    determining the first beam used for uplink channel transmission from the uplink beam or the downlink beam according to the predetermined rule and the second indication information.

3. The method of claim 1, wherein the uplink channel comprises a first physical uplink shared channel (PUSCH), and wherein the first beam comprises a second beam used for transmitting the first PUSCH.

4. The method of claim 3, wherein the predetermined rule or the first indication information comprises one or more of following sub-rules:
    the second beam is determined according to a beam of a physical downlink control channel (PDCCH) used for scheduling the first PUSCH;
    the second beam is determined according to a beam of a first control resource set (CORESET);
    the second beam is determined according to a beam of a demodulation reference signal (DMRS) in a first physical downlink shared channel (PDSCH);
    the second beam is determined according to a beam of a reference signal in a first channel state information reference signal resource indicator (CRI) report of the terminal; wherein the first CRI report is used to characterize a latest CRI report before the terminal determines the second beam;
    the second beam is determined according to a beam used by a first random access channel (RACH); wherein the first RACH is used to characterize a latest RACH before the terminal determines the second beam;
    the second beam is determined according to a beam of a predefined second PUSCH;
    the second beam is determined according to a beam of a sounding reference signal (SRS) used for determining a transmission beam for PDSCH;
    the second beam is determined according to a beam used by a first physical uplink control channel (PUCCH).

5. The method of claim 4, wherein the first CORESET comprises:
    a fixed CORESET; or
    a CORESET with the smallest identification (ID) number in a first slot in which a search space is present; wherein the first slot is used to characterize a latest slot in which the search space is present before the terminal determines the second beam.

6. The method of claim 4, wherein the first PDSCH comprises:
    a latest PDSCH before the terminal determines the second beam; or
    a latest PDSCH before the terminal determines the second beam, and the latest PDSCH is within a time window; or
    a latest PDSCH before the terminal determines the second beam, and the latest PDSCH is out of a time window.

7. The method of claim 4, wherein the beam used by the first PUCCH channel comprises:
    a beam of a predefined PUCCH resource; or
    a beam of a dynamically scheduled PUCCH resource for feeding back acknowledgement (ACK) information or non-acknowledgement (NACK) information.

8. The method of claim 7, wherein the predefined PUCCH resource comprises:
    a fixed PUCCH resource; or
    a PUCCH resource with a resource index changing according to a specified rule.

9. The method of claim 1, wherein the uplink channel comprises a second PUCCH, and wherein the first beam comprises a third beam used for transmitting the second PUCCH.

10. The method of claim 9, wherein the predetermined rule or the first indication information comprises one or more of following sub-rules selected from the following:
the third beam is determined according to a PDCCH indication;
the third beam is determined according to a beam of a PDCCH used for scheduling the second PUCCH;
the third beam is determined according to a predefined third PUSCH;
the third beam is determined according to a beam used by a second RACH; wherein the second RACH is used to characterize a latest RACH before the terminal determines the third beam;
the third beam is determined according to a beam of a second CORESET;
the third beam is determined according to a beam used by a PDSCH associated with the PUCCH.

11. The method of claim 10, wherein the third PUSCH comprises:
a latest PUSCH before the terminal determines the third beam; or
a latest PUSCH before the terminal determines the third beam, and the latest PUSCH does not exceed a time window.

12. The method of claim 10, wherein the second CORESET comprises:
a fixed CORESET; or
a CORESET with the smallest ID number in a second slot in which a search space is present; wherein the second slot is used to characterize the latest slot in which the search space is present before the terminal determines the third beam.

13. A method for transmitting an uplink channel, performed by a base station, comprising:
determining an uplink beam or a downlink beam;
determining a first beam used for uplink channel transmission according to the uplink beam or the downlink beam, and a predetermined rule or first indication information configured for a terminal by the base station; and
receiving the uplink channel by using the first beam;
wherein the uplink beam comprises one or more of the following: a beam of a latest random access channel, RACH; or a predefined beam of a physical uplink shared channel, PUSCH; and
the downlink beam comprises one or more of the following: a beam of a physical downlink control channel, PDCCH; a beam of a downlink control resource set, CORESET; a beam of a physical downlink shared channel, PDSCH; a beam of a reference signal in a latest channel state information reference signal resource indicator, CRI, report by a terminal; or a beam used for determining sounding reference signal, SRS, in downlink PDSCH.

14. The method of claim 13, wherein the predetermined rule comprises multiple sub-rules;
the determining the first beam used for uplink channel transmission according to the uplink beam or the downlink beam, and a predetermined rule, comprises:
acquiring second indication information configured for the terminal by the base station, wherein the second indication information comprises an identifier used for indicating a sub-rule that is in effect; and
determining the first beam used for uplink channel transmission from the uplink beam or the downlink beam according to the predetermined rule and the second indication information.

15. The method of claim 13, wherein the uplink channel comprises a first physical uplink shared channel (PUSCH), and wherein the first beam comprises a second beam used for transmitting the first PUSCH.

16. The method of claim 15, wherein the predetermined rule or the first indication information comprises one or more of following sub-rules:
the second beam is determined according to a beam of a physical downlink control channel (PDCCH) used for scheduling the first PUSCH;
the second beam is determined according to a beam of a first control resource set (CORESET);
the second beam is determined according to a beam of a demodulation reference signal (DMRS) in a first physical downlink shared channel (PDSCH);
the second beam is determined according to a beam of a reference signal in a first channel state information reference signal resource indicator (CRI) report of the terminal;
wherein a first CRI report is used to characterize a latest CRI report before the terminal determines the second beam;
the second beam is determined according to a beam used by a first random access channel (RACH); wherein the first RACH is used to characterize a latest RACH before the terminal determines the second beam;
the second beam is determined according to a beam of a predefined second PUSCH;
the second beam is determined according to a beam of a sounding reference signal (SRS) used for determining a transmission beam for PDSCH;
the second beam is determined according to a beam used by a first physical uplink control channel (PUCCH).

17. The method of claim 13, wherein the uplink channel comprises a second PUCCH, and wherein the first beam comprises a third beam used for transmitting the second PUCCH.

18. The method of claim 17, wherein the predetermined rule or the first indication information comprises one or more of following sub-rules:
the third beam is determined according to a PDCCH indication;
the third beam is determined according to a beam of a PDCCH used for scheduling the second PUCCH;
the third beam is determined according to a predefined third PUSCH;
the third beam is determined according to a beam used by a second RACH; wherein the second RACH is used to characterize a latest RACH before the terminal determines the third beam;
the third beam is determined according to a beam of a second CORESET;
the third beam is determined according to a beam used by a PDSCH associated with the PUCCH.

19. A terminal comprising a processor and a memory storing a program executable by the processor, wherein the program, when executed by a processor, causes the processor to perform the following steps:
determining an uplink beam or a downlink beam;
determining a first beam used for uplink channel transmission according to the uplink beam or the downlink beam, and a predetermined rule or first indication information configured for the terminal by a base station; and transmitting an uplink channel by using the first beam;

wherein the uplink beam comprises one or more of the following: a beam of a latest random access channel, RACH; or a predefined beam of a physical uplink shared channel, PUSCH; and the downlink beam comprises one or more of the following: a beam of a physical downlink control channel, PDCCH; a beam of a downlink control resource set, CORESET; a beam of a physical downlink shared channel, PDSCH; a beam of a reference signal in a latest channel state information reference signal resource indicator, CRI, report by a terminal; or a beam used for determining sounding reference signal, SRS, in downlink PDSCH.

20. A base station comprising a processor and a memory storing a program executable by the processor, wherein the program, when executed by a processor, causes the processor to perform steps of claim 13.

\* \* \* \* \*